United States Patent [19]

Davis et al.

[11] Patent Number: 4,872,794
[45] Date of Patent: Oct. 10, 1989

[54] TANK MOUNTING APPARATUS

[75] Inventors: Gail F. Davis; Robert L. Baker, both of Duncan, Okla.

[73] Assignee: Halliburton Company, Duncan, Okla.

[21] Appl. No.: 199,970

[22] Filed: May 27, 1988

[51] Int. Cl.$^4$ .............................................. B61D 45/00
[52] U.S. Cl. ......................................... 410/54; 410/68
[58] Field of Search ....................... 410/44, 46, 31–33, 410/54, 68, 71–73, 76, 77–81, 84, 85, 90, 91, 156, 35, 65; 220/1, 5, 1 V, 5 A; 224/315, 326, 42, 45 R

[56] References Cited

U.S. PATENT DOCUMENTS

| | | | |
|---|---|---|---|
| 3,444,824 | 5/1969 | Gutridge | 410/54 |
| 3,552,325 | 1/1971 | Enochian | 410/54 |
| 3,618,999 | 11/1971 | Hlinsky | 410/54 X |
| 3,768,421 | 10/1973 | Gramse | 410/54 |
| 4,163,425 | 8/1979 | Bedard | 410/76 X |
| 4,265,266 | 5/1981 | Kierbow et al. | 137/101.19 |
| 4,515,506 | 5/1985 | Van Gompel et al. | 410/46 |
| 4,538,221 | 8/1985 | Crain et al. | 364/172 |
| 4,715,308 | 12/1987 | Denison et al. | 114/72 |

FOREIGN PATENT DOCUMENTS 623088  11/1962  Belgium ................................ 410/46

Primary Examiner—Johnny D. Cherry
Assistant Examiner—Joseph D. Pape
Attorney, Agent, or Firm—James R. Duzan; L. Wayne Beavers

[57] ABSTRACT

A tank mounting apparatus includes a mounting rack having a full-size tank base location defined thereon, and including a plurality of mounting brackets for mounting either one full-size tank base, two half-size tank bases, four quarter-size tank bases, or one half-size and two quarter-size tank bases within the full-size tank base location. Releasable connecting pins are provided for connecting the tank bases to the mounting brackets.

10 Claims, 14 Drawing Sheets

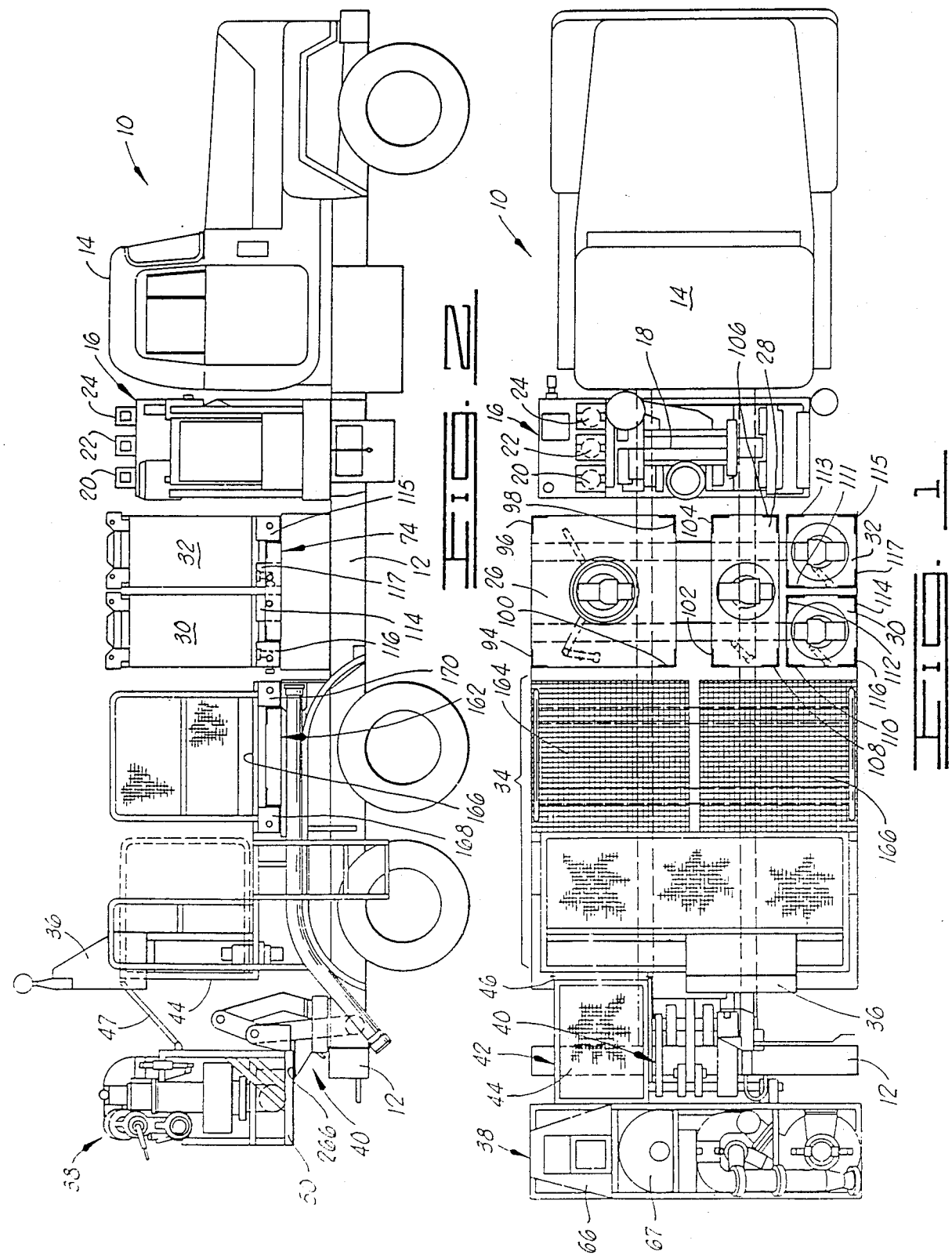

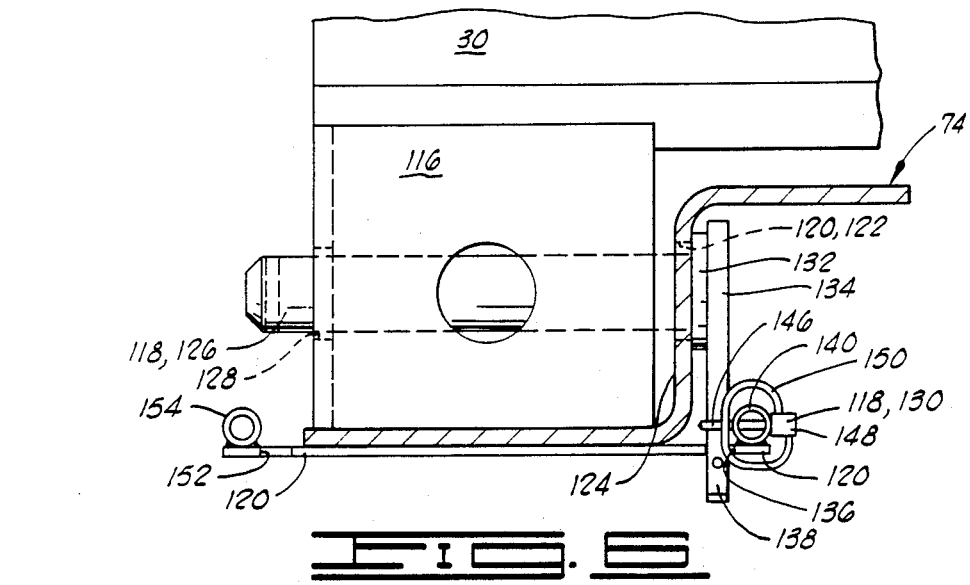
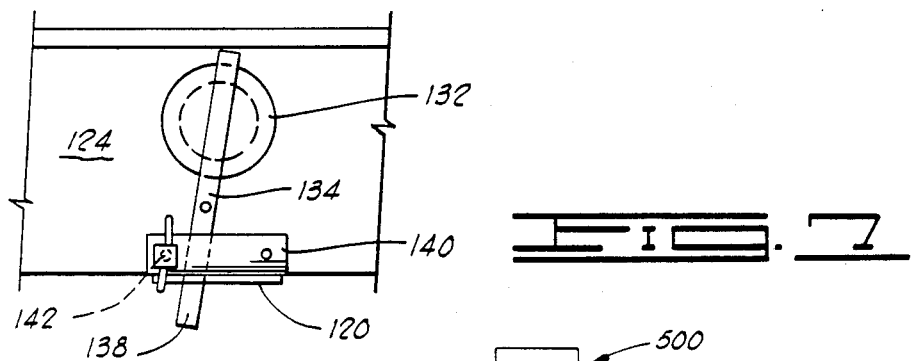
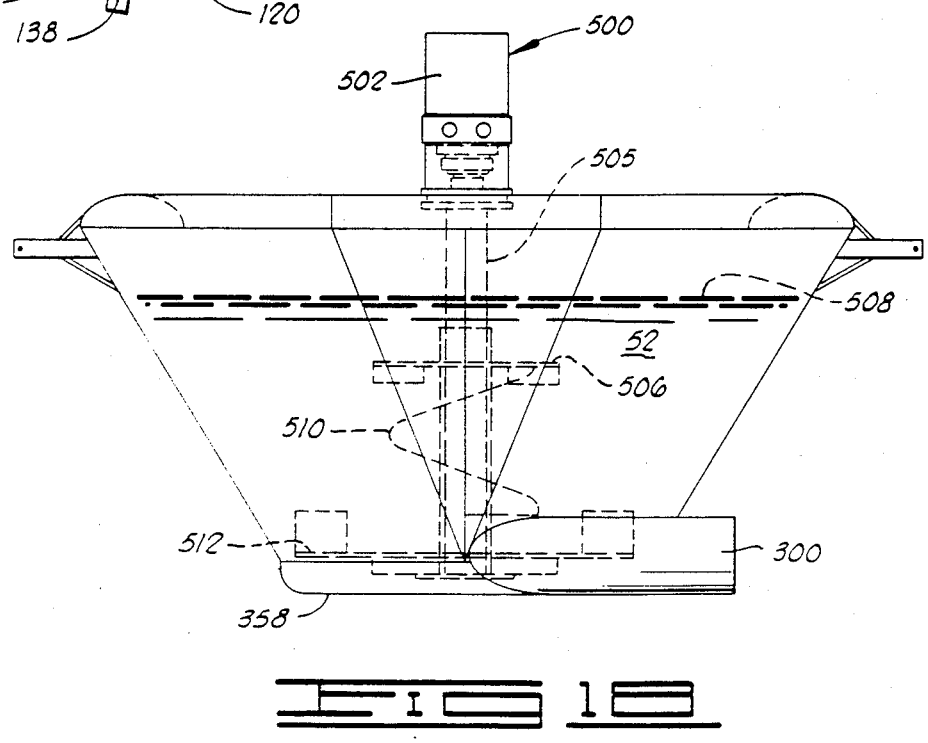

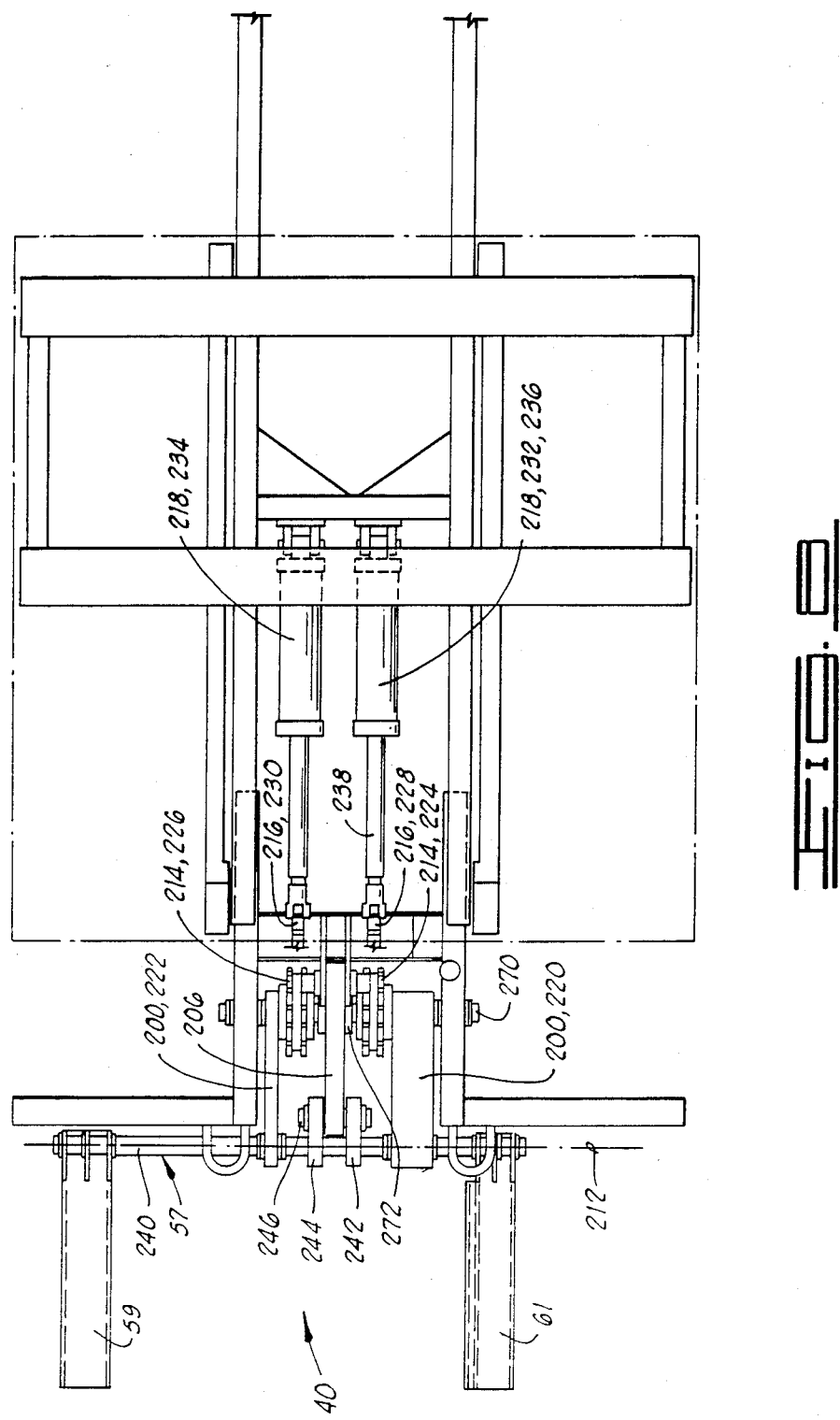

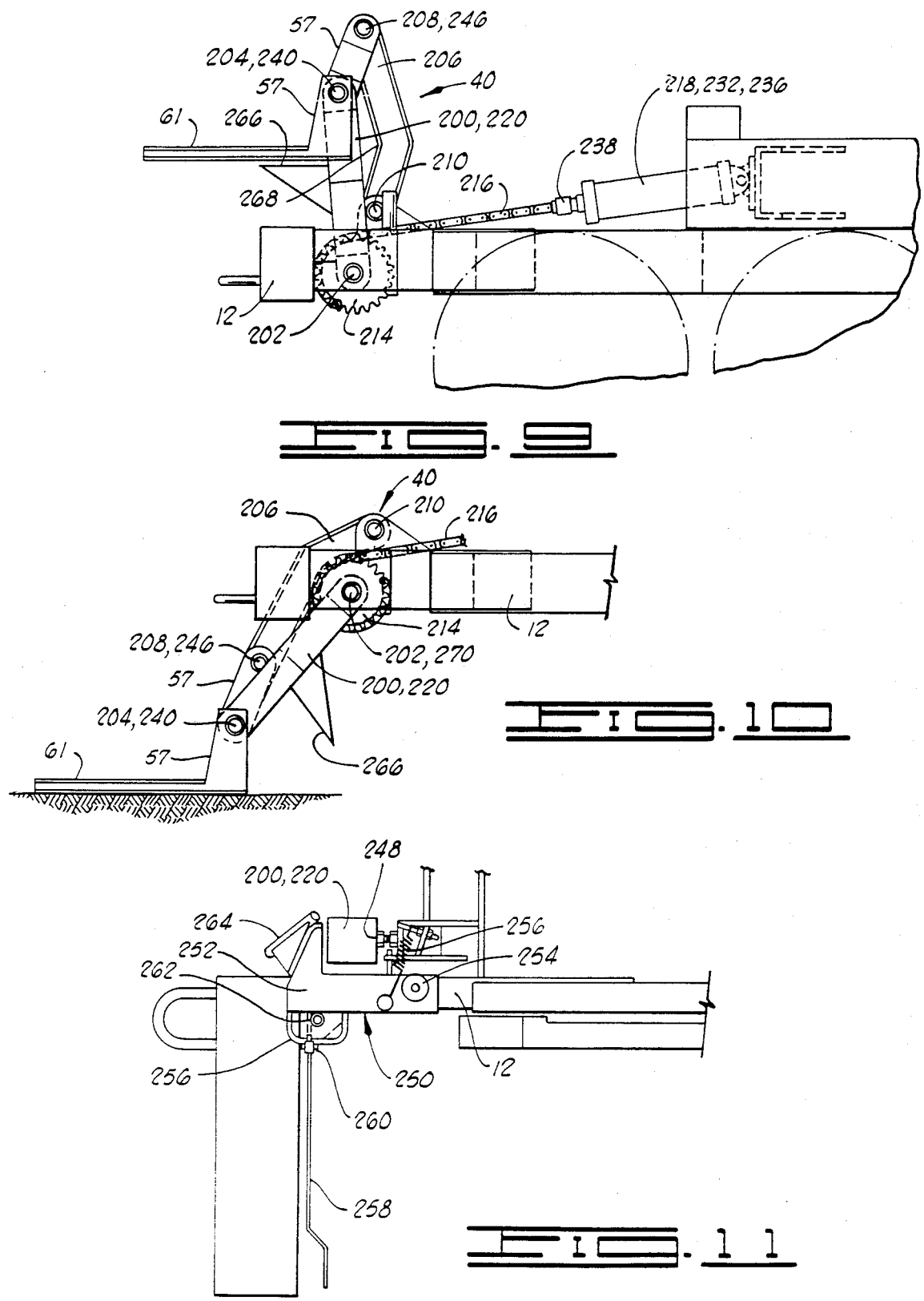

TANK MOUNTING APPARATUS

BACKGROUND OF THE INVENTION

1. Field of the Invention

The present invention relates to storage containers, and particularly, but not by way of limitation, to reusable containers for liquid additives for use in the oil well service industry.

2. Description of the Prior Art

Many activities conducted in the oil well servicing industry require the use of liquid materials which are typically provided in 55-gallon drums. There is a substantial cost involved in the handling and disposal of such drums which typically are not reused.

The prior art does include a number of liquid container systems designed for reuse.

The full-size liquid additive tank 26 disclosed herein is itself a part of the prior art in that it has been on sale by the assignee of the present invention for greater than one year prior to the filing of this application.

A couple of other manufacturers have developed somewhat similar tanks such as those marketed by Hoover Universal, Inc., under the trademark AGRI-TOTE and such as the containers marketed under the trademark "TransStore" by Custom Metalcraft.

SUMMARY OF THE INVENTION

The present invention provides a substantially improved reusable liquid storage container system which is particularly improved in that it includes a mounting rack having a full-size tank base location defined thereon and including a plurality of mounting brackets for mounting either one full-size tank base, two half-size tank bases, four quarter-size tank bases, or one half-size and two quarter-size tank bases within the full-size tank base location. Releasable connecting pins are provided for connecting the tank bases to the mounting brackets.

The mounting rack includes one first pin receiving hole associated with each of the mounting brackets, which first pin receiving hole is disposed through a substantially vertical wall of the mounting rack. A second pin receiving hole disposed in a leg of one of the tanks is aligned with the first pin receiving hole. A connecting pin is received through the aligned first and second pin receiving holes, and a locking bar attached to one end of the connecting pin is received within a notch in the mounting rack, and held therein by a pin retainer connected to the rack.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a plan view of a truck-mounted blender system with associated power source, liquid additive storage, work station, and lifting apparatus.

FIG. 2 is an elevation view of the apparatus of FIG. 1.

FIG. 6 is an enlarged sectioned view taken along line 6—6 of FIG. 3 showing the details of the connecting pin and retainer pin as assembled with the mounting rack and a container.

FIG. 7 is a right end view of the structure of FIG. 6, with the container not shown in this view.

FIG. 8 is a plan view of the lifting apparatus mounted on a truck bed showing the apparatus in the DOWN position.

FIG. 9 is a side elevation view of the lifting apparatus of FIG. 8 showing the apparatus in the UP position.

FIG. 10 is a side elevation view similar to FIG. 9 but showing the lifting apparatus in the DOWN position.

FIG. 11 is a plan view similar to FIG. 8 showing the latch assembly for locking the lifting apparatus in its UP position.

FIG. 18 is an enlarged view of the blender tub showing in dashed lines the location of a mechanical agitator located therein.

DETAILED DESCRIPTION OF THE PREFERRED EMBODIMENTS

Figure 3:
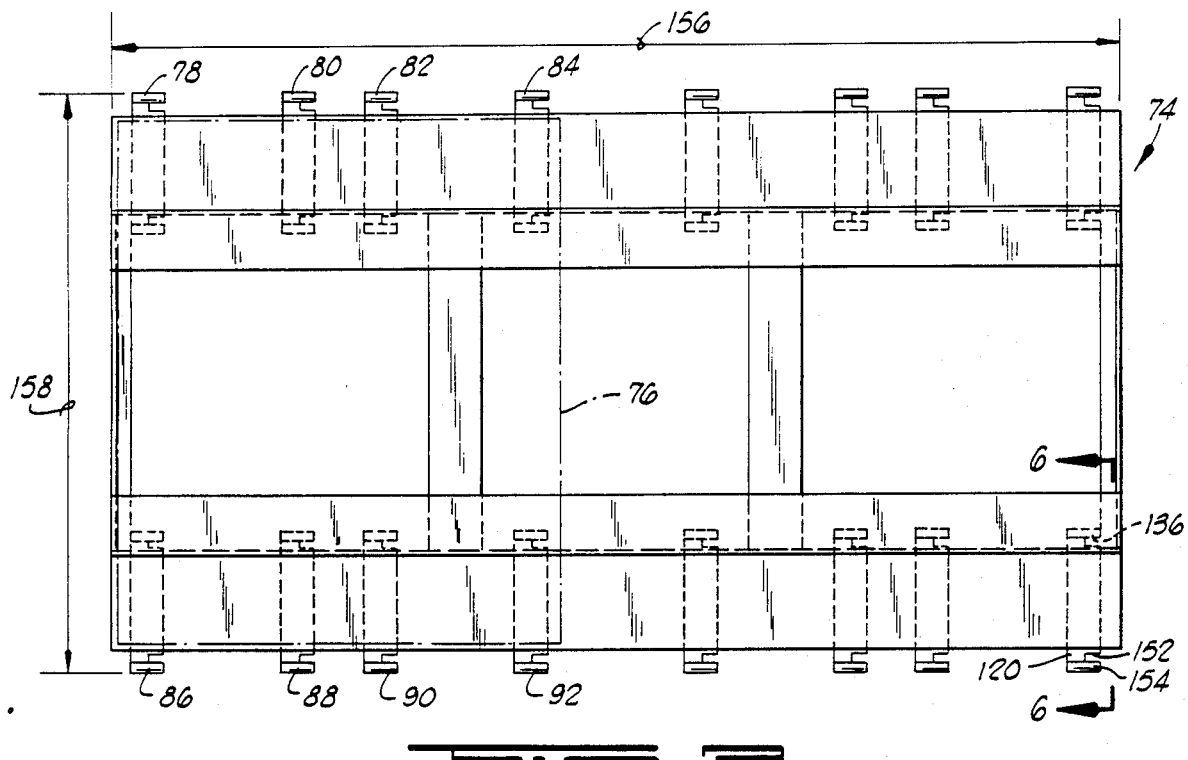
FIG. 3 is a plan view of the mounting rack for the liquid additive tanks.

General Description of the Layout of the Vehicle

Turning now to the drawings, and particularly to FIGS. 1 and 2, a blender vehicle apparatus is there-shown and generally designated by the numeral 10. In the particular embodiment shown, the vehicle 10 is a motor truck having a vehicle frame 12 with a driver's cab 14 mounted thereon.

Behind the cab 14 there is located an internal combustion engine driven hydraulic power package generally designated by the numeral 16. The power package 16 includes an internal combustion engine 18 which drives three hydraulic power pumps 20, 22 and 24 which provide hydraulic power fluid to the various other systems located upon the frame 12 of the vehicle 10.

The various systems mounted on the vehicle 10 have a power requirement which can be supplied by only two of the three hydraulic power pumps 20, 22 and 24, thus providing a safety feature in that if one of the pumps 20, 22 and 24 fails, there will be sufficient hydraulic power provided by the two remaining pumps to complete a well service job which is under way.

Adjacent and to the rear of the power package 16, a plurality of liquid additive storage tanks 26, 28, 30 and 32 are mounted upon the frame 12.

An operator's work platform 34, which includes a control station 36 is mounted on the vehicle frame 12 to the rear of and adjacent the storage tanks 26-32.

To the rear of the work platform 34 there is located a hydraulically powered blender assembly generally designated by the numeral 38.

A hydraulically powered lifting means generally designated by the numeral 40, is mounted on the vehicle frame 12 for moving the blender assembly 38 between a lowered or DOWN position as illustrated in FIGS. 1, 8 and 10 and a raised position as illustrated in FIGS. 2 and 9. The raised position of blender assembly 38, as seen in FIGS. 2 and 9, has the blender assembly 38 located above the vehicle frame 12 and relatively closely adjacent the work platform 34 on the side thereof opposite the storage tanks 26-32.

The lifting means 40 is further characterized in that when the blender assembly 38 is in its raised position as shown in FIG. 2, the blender assembly 38 is located at least in part directly above the vehicle frame 12. When the lifting means 40 moves the blender assembly 38 from its raised position to its lowered position as seen in FIGS. 1 and 10, the blender assembly 38 is moved in a generally horizontal direction rearward away from the work platform 34 and then is moved downward to an elevation as seen in FIG. 10 which is lower than the vehicle frame 12.

The importance of this is that regulations for loads pulled on the public highways prevent the extension of a load more than two feet behind the end of the vehicle frame. The construction of lifting means 40 allows compliance with such regulations while at the same time providing a means for easily moving the load to the rear of the vehicle frame 12 and then downward to a ground level position.

A fold-up walkway means generally designated by the numeral 42 includes a walkway 44 having one end thereof pivotally mounted at 46 adjacent the work platform 34. The walkway 44 extends generally horizontally from the work platform 34 to the blender assembly 38 when the blender assembly 38 is in its lowered position as is best in FIG. 1.

The fold-up walkway means 42 includes a walkway linkage 47, best seen in FIG. 2, constructed to swing the walkway 44 up towards the work platform 34 when the blender assembly 38 is moved from its said lowered position to its said raised position as illustrated in FIG. 2.

The details of the blender assembly 38 are best shown in FIGS. 14-17. It is noted that the blender assembly shown in FIGS. 14-18 is slightly modified as compared to that shown in FIGS. 1 and 2, in that a concentrator means 48 has been added to the blender assembly. To designate this modification, the blender assembly of FIGS. 14-17 is designated by the numeral 38A. Aside from the differences associated with the addition of the concentrator means 48, however, the blender assembly 38A is generally the same as and is representative of the blender assembly 38 of FIGS. 1 and 2. In the following description any reference to blender assembly 38 or blender assembly 38A may be taken as referring to either unless the context of the reference deals with the concentrator 48 or associated apparatus which are found only on the embodiment 38A.

Figure 14:
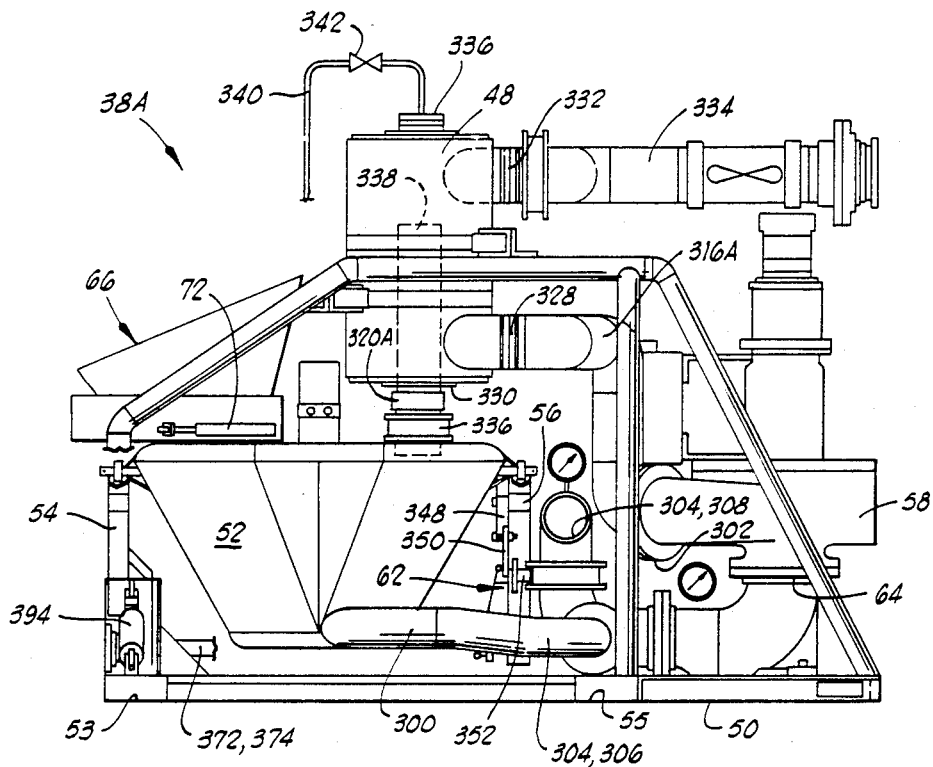
FIG. 14 is a rear elevation view of the blender assembly of FIG. 1, which has been modified by the addition of a concentrator downstream of the low pressure pump. The blender assembly of FIG. 14 utilizes a steel blender tub. It is noted that this rear elevation view is taken as it would be seen standing behind the rear of the truck 10 and looking toward the blender apparatus 38.

Turning attention now to the general arrangement of the apparatus contained in the blender assembly 38, with particular reference to FIG. 14, the blender assembly includes a blender assembly base 50. A blender tub 52 is supported from the base 50 by first and second spaced parallel support arms 54 and 56. In a manner further described below, the support arms 54 and 56 are pivotally connected to the base 50, and the blender tub 52 is pivotally suspended from the support arms 54 and 56.

The blender assembly base 50 may also be generally described as a blender pallet base 50 having a pair of fork openings 53 and 55 defined therein. The lifting means 40 includes a load fork 57 having a pair of tines 59 and 61 which are received in the fork openings 53 and 55 of pallet base 50.

The blender assembly 38 further includes one and only one blender pump means 58, supported from the base 50, for drawing base fluid or "clean" fluid through a fluid supply conduit 304, 306 from a fluid supply (not shown) and for drawing blended fluid from the blender tub 52. The pump means 58 recirculates a portion of the combined base fluid and blended fluid back to the blender tub 52, and discharges another portion of the combined base fluid and blended fluid away from the blender assembly 38. The base fluid is often referred to as "clean" fluid, but it should be noted that the base fluid is often clean only in the sense that it has not yet been blended with sand. This "clean" base fluid may in fact be very muddy, oily or the like.

An automatic level control means generally designated by the numeral 62 is operably associated with the blender tub 52 and the blender pump means 58 for controlling a fluid level within the blender tub 52.

The lifting means 40 which moves the blender assembly 38 between its upper and lower positions can be further characterized as a means for placing the blender assembly 38 at ground level as illustrated in FIG. 10 to thereby minimize an elevation of a suction inlet 64 of blender pump means 58. All of this operation is further described in considerable detail below.

One important reason, however, for providing the lifting means 40 whereby the blender assembly 38 can be lowered to ground level, is that the blender assembly 38 uses one and only one pump means 58 for both drawing base fluid from a fluid supply and for drawing blended fluid including sand or the like from the blender tub 52, and then discharging the combined materials to a point of usage such as a high pressure pump for injecting the material into an oil well, and for also recirculating a portion of the fluid back to the blender tub 52. Since one and only one pump is utilized to accomplish all of these duties, its performance is sometimes limited by its ability to draw base liquid from whatever liquid supply is available, particularly if that liquid supply is at a relatively low elevation. This drawback of such a single pump system is to a significant extent alleviated by the placement of the blender assembly 38 at ground level, rather than having it remain on the vehicle frame 12. This provides several additional feet of suction head to the suction inlet 64 of the pump means 58.

It is further noted that the lifting means 40 may place the blender assembly 38 at an elevation somewhat lower than the ground elevation on which the truck 10 rests. That is, the blender assembly 38 may actually be lowered into a relatively shallow depression.

It is also noted that it is much easier to add dry additives such as sand when the blender apparatus 38 is sitting at ground level.

Figure 16:
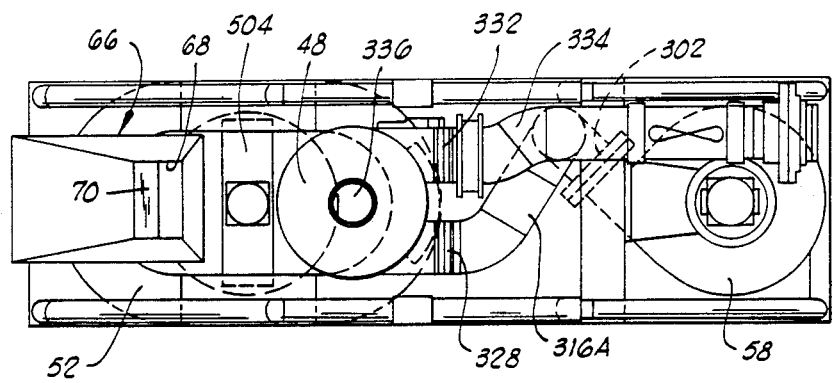
FIG. 16 is a plan view of the apparatus of FIG. 14.

As seen in FIGS. 14 and 16, the blender assembly 38 includes a dry or particulate materials hopper generally designated by the numeral 66 located above the blender tub 52 and having an adjustable lower outlet 68 for controlling a flow of dry materials such as sand into the blender tub 52. The adjustable outlet 68 has a sliding gate 70 (see FIG. 16) controlled by a hydraulic ram 72 (see FIG. 14) for controlling the size of the opening of the adjustable outlet 68.

Also, the dry materials may sometimes be introduced into tub 52 through an eductor 67 (see FIG. 1). The eductor 67 directs the dry material through a central opening, while directing a recirculating stream 320 (see FIG. 12) through an annular opening surrounding the central opening so as to impinge the recirculating stream 320 upon the incoming dry materials to thoroughly wet them.

Liquid Additive Tanks And Mounting Rack

Referring to FIGS. 1 and 2, the liquid additive storage tanks 26, 28, 30 and 32 are mounted upon a mounting rack 74 which is supported from the vehicle frame 12.

Figure 4:
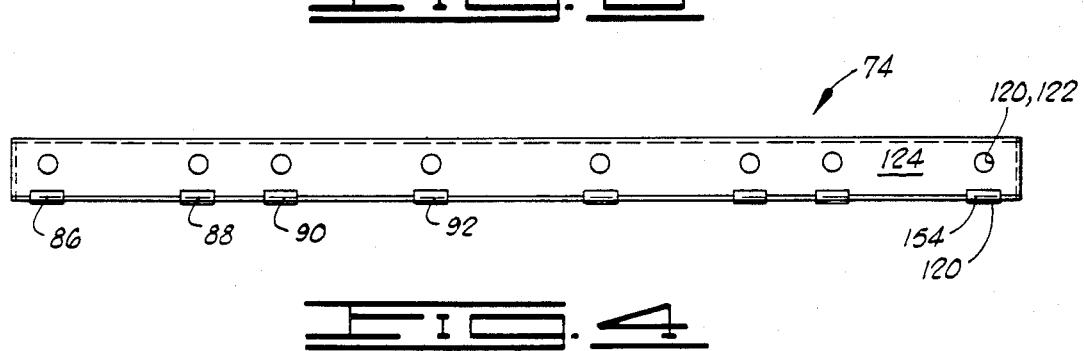
FIG. 4 is a side elevation view of the mounting rack of FIG. 3.
Figure 5:
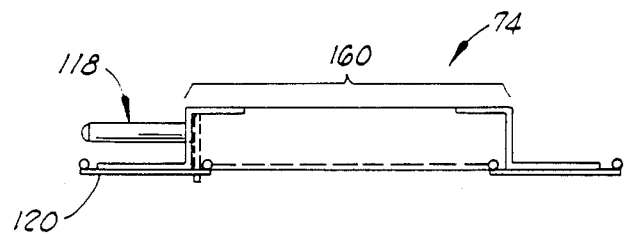
FIG. 5 is an end elevation view of the mounting rack of FIG. 3.

The mounting rack 74 is shown in detail in FIGS. 3, 4 and 5. FIG. 3 is a plan view of the mounting rack 54, the length of which lies crossways across the width of vehicle frame 12.

The right end view of mounting rack 74 as seen in FIG. 2 is the same as and corresponds to the right end view of mounting rack 74 shown in enlarged view in FIG. 5.

The mounting rack 74 has two full-size tank base locations defined thereon. One of those full-size tank base locations has been outlined in phantom lines and designated by the numeral 76 in FIG. 3.

The mounting rack 74 has eight mounting means 78-92 for mounting either one full-size tank base, two half-size tank bases, four quarter-size tank bases, or one-half size and two quarter-size tank bases, within the full-size tank base location 76. Four of the mounting means 78, 80, 82 and 84 are located along a front side of the full-size tank base location 76, and the other four mounting means 86, 88, 90 and 92 are located along the opposite rear side of the full-size tank base location 76.

As is apparent in FIG. 3, the full-size tank base location 76 is generally rectangular in shape. The eight mounting means 78-92 include four corner mounting means 78, 84, 86 and 92 located generally in the four corners of the generally rectangular-shaped full-size tank base location 76. Also included are four intermediate mounting means 80, 82, 88 and 90.

A full-size tank such as tank 26 is mounted in the full-size tank base location 76 as follows. The full-size tank 76 includes four angular-shaped legs 94, 96, 98 and 100. When the full-size tank 26 is set in place within the full-size tank base location 76 as shown in FIG. 1, the four legs 94, 96, 98 and 100 will then be releasably connected, in a manner described below, to the corner mounting means 86, 78, 84 and 92, respectively.

Two half-size tanks such as tank 28 would be located within the full-size tank base location 76 as follows.

The half-size tank 28 includes four right-angle shaped legs 102, 104, 106 and 108. A first half-size tank 28 would be located on the left-hand side of the full-size tank base location 76 by releasably connecting its legs 102, 104, 106 and 108 with mounting means 86, 78, 80 and 88, respectively. A second half-size tank 28 would be located on the right-hand side of full-size tank base location 76 with its legs 102, 104, 106 and 108 releasably connected to mounting means 90, 82, 84 and 92, respectively.

One half-size tank 28 and two quarter-size tanks such as 30 and 32 can be mounted in the full-size tank base location 76 in a manner like the arrangement of tanks 28, 30 and 32 illustrated in FIG. 1. The half-size tank 28 would be mounted as previously described and connected to mounting means 86, 78, 80 and 88.

The two quarter-size tanks 30 and 32 would be mounted as follows. The quarter-size tank 30 has a quarter-size tank base including four legs 110, 112, 114 and 116. Similarly, quarter-size tank 32 has legs 111, 113, 115 and 117.

The legs 112 and 114 of tank 30 are fixedly connected to the legs 111 and 117, respectively, of the tank 32 such as by bolting the same together with a spacer (not shown) sandwiched therebetween, so that the bolted-together quarter-size tanks 30 and 32 occupy the same space as a single half-size tank 28.

Then this bolted-together combination of two quarter-size tanks 30 and 32 could be mounted within the right-hand side of full-size tank base location 76 by releasably connecting legs 110, 113, 115 and 116 to mounting means 90, 82, 84 and 92, respectively.

It will also be apparent from the above that four quarter-size tanks could be mounted within the full-size tank base location 76 by assembling two pairs of quarter-size tanks and then mounting each of the pairs in the manner just described.

The legs of the tanks are connected to the mounting means by a plurality of releasable connecting means 118 as best shown in FIGS. 6 and 7. FIG. 6 is an enlarged view of the left end of FIG. 5 showing the details of construction of one of the mounting means 120 as connected to the leg 116 of quarter-size tank 30 by one of the releasable connecting means 118. The view of FIG. 6 is taken along line 6—6 of FIG. 3.

Each of the mounting means such as 120 includes a first pin receiving hole such as 122 disposed through a substantially vertical wall 124 of rack 74.

Each of the releasable connecting means such as 118 includes a cylindrical connecting pin 126 constructed to be received through said first pin receiving hole 122 of said mounting means 120 and an aligned second pin receiving hole 128 defined in the leg 116 of the base of quarter-size tank 30.

The releasable connecting means 118 further includes a pin retainer means 130 for retaining the connecting pin 126 in the first and second pin receiving holes 122 and 128.

The connecting pin 126 has an enlarged generally circular head 132 defined on one end thereof, and includes a radially extending locking bar 134 fixedly attached to head 132 such as by welding. The locking bar 134 extends radially from the connecting pin 118.

The mounting means 120 includes a notch means 136 defined in the mounting rack 74 for receiving an end 138 of the locking bar 134 as best seen in FIGS. 6 and 7.

The mounting means 120 includes a tubular member 140 fixedly attached thereto as by welding, which lies adjacent the notch means 136. The tubular member 140 has a pair of transverse retaining pin receiving holes 142 disposed therethrough.

The pin retainer means 130 includes a pin 146 having a head 148 defined thereon with a loop-shaped retainer clip 150 attached to the head 148.

When the connecting pin 126 is placed through the first and second pin receiving hole's 122 and 128, the enlarged head 132 abuts the wall 124. The connecting pin 126 will then rotate due to the action of gravity upon the radially extending locking bar 134 until the end 138 of locking bar 134 is received within the notch 136 and rests against the inner extremity thereof. Then, the pin retainer means 130 is utilized to retain the end 138 of locking bar 134 in the notch 136. This is accomplished by sliding the retainer pin 146 thereof through the holes 142 in tubular member 140 so that the retainer pin 146 extends across the notch means 136 so as to prevent the end 138 of locking bar 134 from rotating out of notch means 136. This holds the connecting pin 126 in place so that the container 30 is held in place relative to the rack 74.

As can best be seen in FIGS. 3 and 6, the mounting means 120 includes a second notch means 152 on an opposite side of the vertical wall 124 from the first notch means 136, with an associated second tubular member 154 similar to the tubular member 140. This permits the connecting pin 126 to be inserted through the first and second pin receiving holes 122 and 128 in either direction. If the connecting pin 126 is reversed from the position shown in FIG. 6, the locking bar 134 will be received in the second notch means 152 and the pin retainer means 130 will be connected to the second tubular structure 154 to retain the locking bar 134 within the second notch means 152. This feature is particularly advantageous when the rack 74 is mounted with associated structures so that it is difficult if not impossible to insert the connecting pin 126 from one direction or the other.

As can best be seen in FIG. 3, the mounting rack 74 has a length 156 and a width 158. The mounting rack 74 has a central raised portion 160 best seen in FIG. 5 which extends generally parallel to the length 156 of rack 74. As best seen in FIGS. 1 and 6, when the base of one of the tanks 26 or 28, or an assembled pair of quarter-size tanks 30 and 32 is received on the rack 74, the raised portion 160 is relatively closely straddled by the legs such as 116 and 122 of the tanks or assembled pairs of quarter-size tanks. This aids in positioning the tanks on the rack 74 prior to the time that the connecting pins 126 are inserted.

Referring now to FIG. 2, it is seen that a second rack means 162, substantially identical to first rack means 74, is attached to the vehicle frame 12 adjacent the tank mounting rack means 74. This second rack means is shown in FIGS. 1 and 2 as being used to mount a portion of the work platform 34, which as seen in FIG. 2 comes in two substantially square sections 164 and 166. The work platform sections 164 and 166 each have a base construction substantially identical to the construction of the base of a full-size tank such as tank 26, whereby one of the work platform sections 164 or 166 may be connected to a full-size tank base location on the second rack means 62. Referring to FIG. 2, an end view is there seen of the base of second platform section 166 and two legs 168 and 170 thereof are visible. The legs 168 and 170 are constructed substantially identical to the legs of the tanks and are similarly connected to mounting means on the second rack means 162.

The platform sections 164 and 166 may also be generally referred to as pallets having a pallet base including the legs 168 and 170, which pallet base is interchangeable with the base of one of the full-size tanks such as 26. Thus, the platform sections 164 and 166 may be utilized as pallets to load, for example, a stack of bags of dry material or the like thereon at ground level, and the pallet may then be lifted into place and connected to the second mounting rack 162. The dry material, such as sand, would then be readily usable by an operator working on the work platform 34.

The Lifting Apparatus

The details of construction of the lift means 40 will now be described with particular reference to FIGS. 8-11.

The lifting means or lifting apparatus 40 is physically attached to and includes as a functional part thereof a portion of the vehicle frame 12, which may be referred to generally as a base of the lifting apparatus 40.

The lifting apparatus 40, as previously mentioned, includes the load fork 57 having tines 59 and 61 which are received within fork openings 53 and 55 of the pallet base 50 of blender assembly 38. The load fork 57 may also be generally referred to as a load support means 57 for engaging and supporting a load as said load support means 57 and said load are moved between a lowered position as shown in FIG. 10 and a raised position as shown in FIG. 9 relative to said vehicle frame or base 12. The load referred to may be the blender assembly 38.

The lifting apparatus 40 further includes lifting arm means 200 connected at a first pivotal connection 202 to frame 12 and at a second pivotal connection 204 to load support means 57, for moving the load support means 57 between its said lowered and raised positions.

Lifting apparatus 40 further includes a stabilizer arm means 206 connected at a third pivotal connection 208 to said load support means 57, and connected at a fourth pivotal connection 210 to frame 12, for controlling a rotational orientation of said load support means 57 about an axis 212 (see FIG. 8) of said second pivotal connection 204 relative to said frame 12.

The lifting apparatus 40 further includes sprocket means 214 rigidly attached to said lifting arm means 200 substantially coaxial with said first pivotal connection 202.

The lifting apparatus 40 further includes chain means 216 (see FIG. 9) operably engaged with sprocket means 214, and power drive means 218 mounted on the frame 12 and operably connected to the chain means 216 for moving the chain means 216 to rotate said sprocket means 214 and to thereby move said load support means 57 between its said lowered and raised positions.

The lifting arm means 200 preferably includes first and second substantially parallel spaced lifting arms 220 and 222 as seen in FIG. 8.

The sprocket means 214 preferably includes first and second sprockets 224 and 226 rigidly attached to said first and second lifting arms 220 and 222, respectively.

The chain means 216 includes first and second chains 228 and 230 operably engaged with said first and second sprockets 224 and 226, respectively.

The power drive means 218 includes first and second separate power drive means 232 and 234 operably connected to said first and second chains 228 and 230, respectively.

Each of the first and second power drive means 232 and 234 is a hydraulic ram having a cylinder 236 thereof mounted on frame 12 and having a reciprocal rod 238 thereof attached to its respective chain 228 or 230.

Each of the first and second rams 232 and 234 is sized such that it is capable, in the absence of the other, of lifting a maximum design load of the load support means 57, thus providing a redundancy safety feature in the event of failure of one of the rams.

The tines 59 and 61 of the load fork 57 are rigidly attached to a cylindrical rod 240 best seen in FIG. 8. The rod 240 is rotatingly journaled in the outer ends of the first and second lifting arms 220 and 222 to define the second pivotal connection 204 previously mentioned.

Rigidly attached to the cylindrical beam 240 of load fork 57 are two upwardly extending forwardly tilted ears 242 and 244 between which is received an outer end of the stabilizer arm 206.

A connecting pin 246 is journaled through the upper ends of ears 242 and 244 and through the outer end of stabilizer arm 206 to define the third pivotal connection 208 previously mentioned.

As is best seen in FIGS. 9 and 10, the first, second, third and fourth pivotal connections 202, 204, 208 and 210, respectively, define a parallelogram four-bar linkage. The distance between second pivotal connection 204 and third pivotal connection 208 is equal to the distance between first pivotal connection 202 nd fourth pivotal connection 210. Also, the distance between first and second pivotal connections 202 and 204 is equal to the distance between third and fourth pivotal connections 208 and 210.

This parallelogram linkage results in the load fork 57 being maintained with tines 59 and 61 horizontal throughout the movement of the lifting means 40.

As is further explained below, the lifting apparatus 40 and any load carried by load fork 57 can be lowered from its upper position of FIG. 9 to its lower position of FIG. 10 by extending the rods 238 of rams 232 and 234 thus allowing the weight carried by the load fork 57 to rotate the lifting arms 220 and 222 and stabilizer arm 206 counterclockwise as viewed in FIG. 9 downward to the position shown in FIG. 10. Similarly, the load may then be lifted upward from the position of FIG. 9 to the position of FIG. 10 by retracting the rods 238 of rams 232 and 234.

An upper limit means 248 (see FIG. 11) is provided for limiting upward pivotal motion of the lifting arm means 200 to define the upwardmost position of the lifting arm means 200 and the corresponding raised position of the load fork 57.

As seen in FIG. 11, the upper limit means comprises an adjustable bolt and locking nut arrangement threaded into a portion of the vehicle frame 12 and arranged to abut the first lifting arm 220 to limit upward motion thereof at the position shown in FIG. 9. The upper limit means 248 is adjusted to limit the upward pivotal motion of first lifting arm 220 at a position slightly short of a vertical position thereof, as indicated in FIG. 9. This permits the weight of the apparatus and of the load carried by load fork 57 to rotate the lifting apparatus 40 counterclockwise back down to the lowered position of FIG. 10 once the lifting force of the rams 232 and 234 is released. Of course, the force exerted by rams 232 and 234 will be gradually reduced so as to slowly lower the load fork 57 and the blender assembly 38 carried thereby.

As is further shown in FIG. 11, the lifting apparatus 40 includes a latch means 250 operably associated with the first lifting arm 220 for releasably latching the first lifting arm 220 in its said upwardmost position.

With the lifting apparatus 40 latched in its upper position, the load may be released from rams 232 and 234.

The latch means 250 includes a latch arm 252 pivotally connected to vehicle frame 12 at pivot point 254. A resilient spring 256 biases the latch arm 252 toward the latched position as shown in FIG. 11.

The latch arm 252 includes a handle 256 which may be grasped by a human operator to pull the latch arm 252 out of the way of first lifting arm 220 so as to allow first lifting arm 220 to move downward from the position of FIG. 9 toward the position of FIG. 10. A safety release handle 258 is pivotally connected to vehicle frame 12 at pivotal connection 260 and is operably attached to a release pin 262 which extends upward through the handle 256 so that in order to open the latch means 250, it is necessary for the human operator first to raise the safety release handle 258 upwards thus moving the release pin 262 downwards out of the way of the lifting arm 252, and simultaneously the human operator can pull on the handle 256 to rotate the latch arm 252 counterclockwise as seen in FIG. 11 out of the way of first lifting arm 220.

The latch arm 252 further includes a cam surface 264 constructed on its rearward end which is engaged by the first lifting arm 220 when the first lifting arm 220 moves upward from its down position toward its up position, to cam the latch arm 252 out of the way.

The first and second lifting arms 220 and 222 each include a clamping shelf means 266, attached thereto, for clamping the pallet base 50 (see FIG. 14) of blender assembly 38 between the tines 59, 61 and the clamping shelf means 266 when the blender assembly 38 is in a raised position as illustrated in FIG. 2. This clamping of the pallet base 50 between the clamping shelf means 266 and the tines 59, 61 stabilizes the blender assembly 38 in its raised position for transport by the vehicle 10. This clamping arrangement causes the blender assembly 38 and the entire lifting means 40 to be relatively rigidly connected together when the blender apparatus 38 is in the raised position of FIG. 2.

The lift system 40 provides the capability of supporting the blender apparatus 38 during transportation. This is contrasted to many prior art forklift type lifts or tailgate type lifts utilized on other trucks which can lift structures but cannot support them during transportation. This is very significant since the blender 38 weighs on the order of three thousand pounds.

The lifting means 40 further includes a lower limit means for limiting downward pivotal motion of the lifting arm means 200 to define a downwardmost position of the lifting arm means 200 short of a position wherein said second pivotal connection 204 is aligned with said first and fourth pivotal connections 202 and 210. This lower limit means is provided by abutment of a lower surface 268 (see FIG. 9) of stabilizer arm 206 with a cylindrical bushing lower limit means 272 journaled on a frame shaft 270 which defines the first pivotal connection 202.

The frame shaft 270 may be considered a portion of the vehicle frame 12, and as is best seen in FIG. 8, the lower ends of the lifting arms 220 and 222, along with the sprockets 224 and 226 are all journaled on the frame shaft 270.

The construction of the lower limit means so as to prevent alignment of pivotal connections 204, 202 and 210 prevents the four-bar linkage from reaching a bottom dead center position which it could not easily pass back through.

The Blender Assembly

Figure 12:
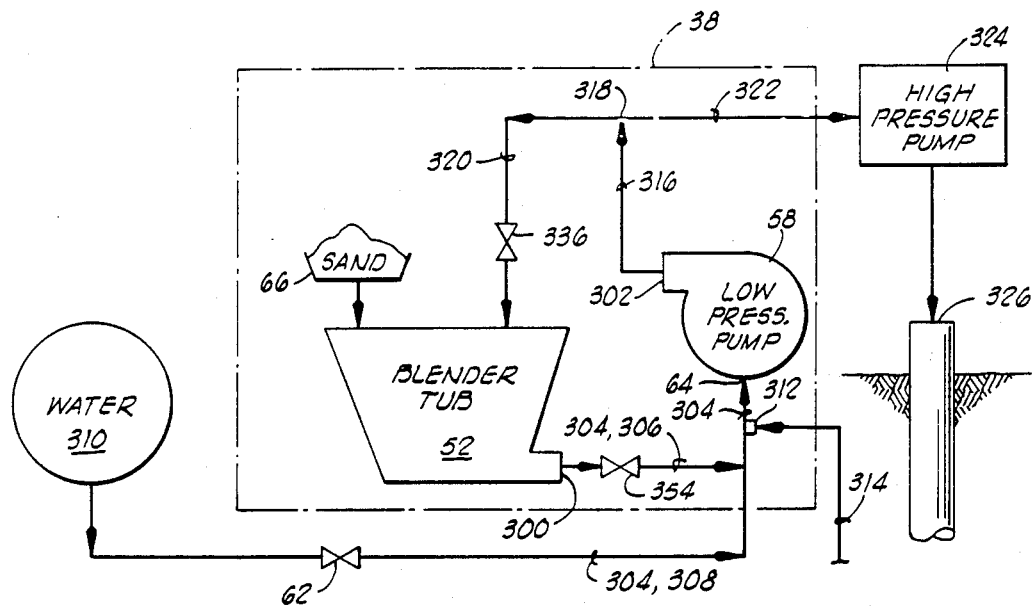
FIG. 12 is a schematic flow diagram of the blender system.
Figure 13:
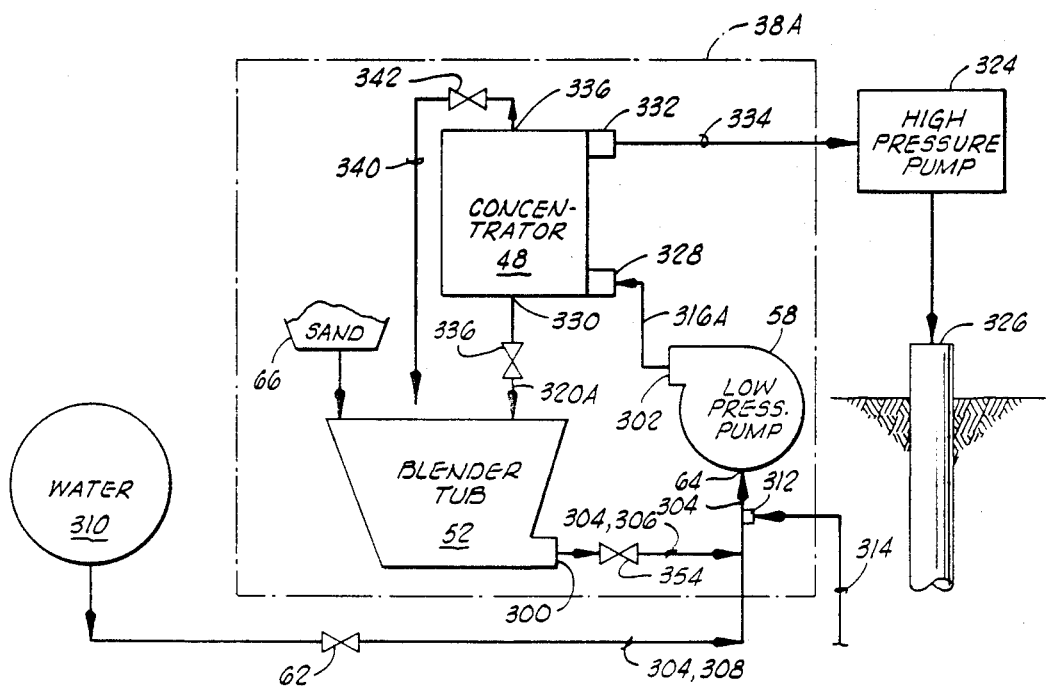
FIG. 13 is a schematic flow diagram similar to FIG. 12, showing the addition of a concentrator downstream of the low pressure pump.

FIGS. 12 and 13 are schematic flow diagrams of the principal components of the blender assembly 38 (without concentrator 48) and 38A (with concentrator 48), respectively. Also shown are associated structures utilized with the blender assembly.

As previously mentioned, the physical appearance of the blender assembly 38 is shown in FIGS. 1 and 2. The physical appearance of the blender assembly 38A is shown in FIGS. 14–17, and is in all respects similar to the blender assembly 38 except for the addition of the concentrator 48 and associated plumbing.

Turning first to FIG. 12, the blender tub 52 provides a means for blending a solid particulate material such as sand in a liquid such as water. The blender tub 52 has a tub outlet 300 defined therein.

The pump means 58, previously described with reference to FIG. 14 as having a suction inlet 64 also includes a pump discharge 302.

A suction conduit means 304 for conducting a tub outlet stream 306 from tub outlet 300, and for conducting a liquid supply stream 308 from a source of liquid supply 310 to the pump suction inlet 304, interconnects tub 52, pump 58 and liquid supply 310.

The suction conduit means 304 further includes a liquid additive suction port 312 for connecting a liquid additive supply conduit 314 from one of the liquid additive storage tanks 26, 28, 30 and/or 32.

In blender apparatus 38, a pump discharge conduit 316 conducting a pump discharge stream 316 is split at a T-connection 318 into a recirculating conduit 320 carrying a recirculating stream 320 back to blender tub 52, and an operating discharge conduit 322 carrying an operating discharge stream 322 to a high pressure pump 324. The high pressure pump 324 may be a typical triplex positive displacement oil field pump for pumping sand-laden fracturing fluids or the like at high pressures into a well 326 for treatment thereof.

In the blender assembly 38A of FIG. 13, including the concentrator 48, the pump discharge stream 316A is directed to a tangential inlet 328 of concentrator 48. The concentrator 48 is constructed in the typical manner of a cyclone separator means for separating the stream of sand-laden fluid from pump discharge stream 316A into higher and lower density portions.

The lower density portion exits a bottom low density outlet 330 of concentrator 48 as a lower density recirculating stream contained within recirculating conduit 320A. The higher density portion exits an upper tangential high density outlet 332 of concentrator 48 as a higher density concentrator discharge stream contained in concentrator discharge conduit 334.

As is best seen in FIG. 14, and as is schematically represented in FIG. 13, the concentrator 48 is located directly above the blender tub 52, and the low density outlet means 330 is disposed in the bottom end of concentrator 48 so that the recirculating stream 320A flows downward by gravity from the low density outlet means 30 into the blender tub 52.

A recirculating control valve means 336 is disposed in the recirculating conduit means 320A for controlling a flow rate of the recirculating stream therein. The setting of the valve 336 also determines the flow rate of discharge stream 334 and a solids concentration in the concentrator discharge stream 334. It will be apparent that as the recirculating control valve means 336 is choked down, less of the low density fluid will be able to exit the low density outlet 330, thus necessitating that this fluid mix with the higher density fluid exiting high density outlet 332 thus reducing the solids concentration in the concentrator discharge stream 334. From an operating standpoint, the valve 336 is set to achieve the necessary flow rate of the recirculating stream 320.

The recirculating control valve 336 also may be closed in some circumstances. For example, when using the system 38 to add diverters to an acid job, the addition of diverters occurs only for a relatively short interval of the overall acid pumping job. The system 38 will initially have valve 336 closed so that pump 58 is in effect being used as a booster pump and the blender tub 52 is not being used. At the point in the job when it is desired to add diverters to the acid, the valve 336 will be opened and the diverters will be mixed with the acid in blender tub 52.

It will be apparent in comparing the systems of blender system 38 in FIG. 12 and blender system 38A in FIG. 13, that in the system of FIG. 13, the concentrator means 48 provides a means for providing a lower concentration of solid particulate material in the blender tub 52 for a given discharge concentration of solid particulate material in the concentrator discharge stream 334 than would be provided in the system of FIG. 12 for a concentration of solid particulate material in the pump discharge stream 322 equal to said given discharge concentration, thereby providing easier mixing in the blender tub 52 for said given discharge concentration in either conduit 334 or 322.

Figure 15:
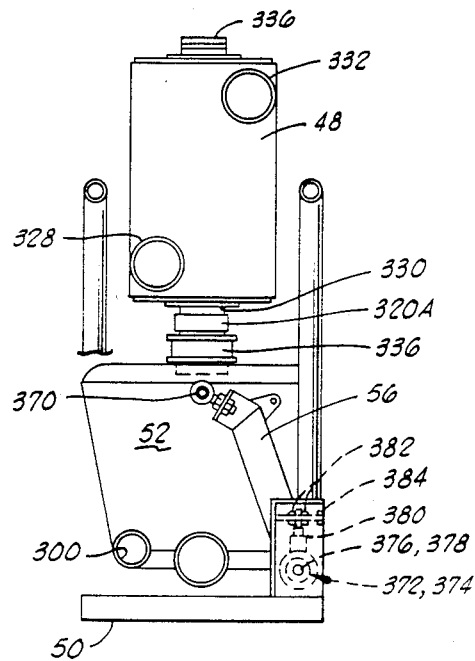
FIG. 15 is a right end elevation view of the apparatus of FIG. 14.

The concentrator 48, as best seen in FIGS. 14, 15 and 16, includes a cylindrical outer shell having the tangential inlets and outlets 328 and 332, and having the bottom outlet 330 and a top outlet 336. The concentrator 348 also has a vortex finder tube 338 shown in dashed lines in FIG. 14 extending upwards from bottom outlet 330 for a distance approximately two-thirds the height of the outer shell of concentrator 48. Thus, as the low pressure pump discharge stream 316A enters the concentrator 48, it will begin to circle clockwise as viewed from above about the vortex finder tube 338 so that a higher concentration of solid particulate material will be present at points closer to the outer shell of the concentrator 48. As the swirling fluid moves upward within the shell of the concentrator 48, a high density portion thereof will exit high density outlet 332 as previously described, and a lower density portion thereof coming from the center of the swirling mass will enter the top end of vortex finder tube 338 and then flow downward out of the low density outlet 330.

It is apparent from the above description that the concentrator means 48 operates solely on energy from the pump discharge stream 316A without any external power source.

As has previously been mentioned, the blender assemblies 38 and 38A each include one and only one pump 58 which sucks in liquid from the liquid supply 310, and sucks in blended liquid and particulate material from the blender tub 52, and then discharges blended liquid and solid particulate material, as diluted by the incoming liquid from liquid supply source 310. This necessarily dilutes the tub outlet stream 306, so that the pump discharge stream 316A has a lower concentration of solid particulate material than does the tub outlet stream 306.

The concentrator means 48 provides a means for partially restoring the solids concentration lost due to the above-described dilution in the low pressure pump 58. It will be apparent, however, that on any steady state basis the particulate material concentration in the tub outlet stream 306 will necessarily be higher than the solid particulate concentration in the concentrator discharge stream 334, since the concentrator 48 is of course less than 100% efficient and some solid particulate material will be returning to the blender tub by means of recirculating conduit 320A.

The relative concentrations of solid particulate material in the various flow streams of the blender assembly 38A can generally be described as follows. The pump discharge stream 316A will have a solids concentration higher than the recirculating stream 320A. The concentrator discharge stream 334 will have a solids concentration higher than the pump discharge stream 316A and the tub outlet stream 306 will have a solids concentration greater than the concentrator discharge stream 334.

The pump 58 will typically have a discharge flow rate 316A in the range of 20 to 25 barrels per minute (BPM) and the recirculation flow rate 320A will typically be on the order of 10 to 15 BPM with the remaining output being directed to the operating discharge 334.

It is noted that, as compared to conventional large capacity blenders, the blender system 38 having a tub capacity of only one to two barrels provides for much quicker changes in solids concentration at the operating discharge 334 or 322 than does a conventional large capacity blender.

With further reference to FIGS. 13 and 14, the top outlet 336 of concentrator 48 may further be described as an entrained air outlet 336. An entrained air return line 340, having a control valve 342 disposed therein, extends from the entrained air outlet 336 back toward the blender tub 52 for directing an entrained air stream including some liquid and some particulate material back toward said blender tub.

The purpose of the entrained air line 340 is to remove as much entrained air as possible from the concentrator 48 to prevent the same from being carried back with the recirculating stream 320A into the mixture in the blender tub 52. By controlling the velocity of the entrained air stream with valve 342, the entrained air stream will move at a relatively low velocity so that a substantial portion of the entrained air can be separated and bled off without being reintroduced into the blender tub. The liquid and solid particulate material contained in the entrained air stream will drop by means of gravity out the lower end of the entrained air return line 340 into the blender tub 52.

Details Of Construction Of The Blender Tub

Now with particular reference to FIG. 14 and FIGS. 23-26, the details of construction of the blender tub 52 and other apparatus closely associated therewith will be set forth.

It is noted that the blender tub 52 shown in FIGS. 14-18 and FIGS. 23-26 is preferably constructed from steel plate. An alternative version of the blender tub constructed with a non-metallic tub liner and a supporting framework is illustrated in FIGS. 27-33 and is described in detail at a later point in this specification.

The blender assembly 38 of FIGS. 1 and 2 and the blender assembly 38A of FIGS. 14-17 may each generally be referred to as a self-leveling mixer apparatus 38. The apparatus 38 has the base 50 previously described.

Figure 17:
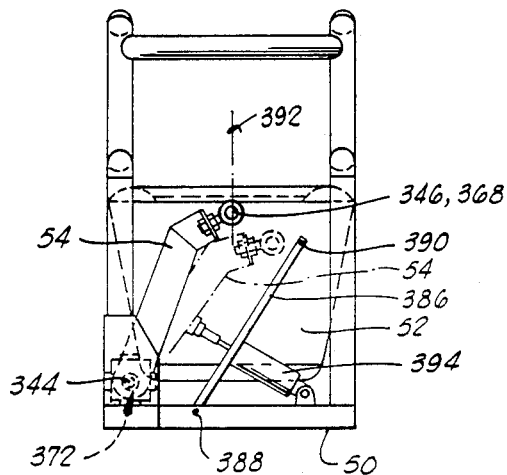
FIG. 17 is a left end elevation view of the apparatus of FIG. 14.

The blender tub 52, which may also be referred to as a mixing tub 52, can be described as a generally conically shaped, generally downwardly tapered, movable blender tub 52 supported from the base 50 in a manner such that the tub 52 is movable between first and second positions relative to the base 50. As is best shown in FIG. 17, the blender tub 52 is supported from base 50 by a support arm means including support arms 54 and 56. The support arm 54 has a first end pivotally connected to the base 50 at a first pivotal connection 344, and has a second end pivotally connected to the blender tub at a second pivotal connection 346.

When tub 52 is referred to as being "generally downwardly tapered", this indicates that along at least most of its vertical height, the tub 52 is tapered around at least most of its perimeter. This can also be referred to as a generally conical shape.

The first or upwardmost position of the blender tub 52 and the blender tub support arm 54 is shown in solid lines in FIG. 17, and the second or lower position of the blender tub support arm 54 and blender tub 52 is represented by the phantom representation of the lower position of blender tub support arm 54 shown in FIG. 17. In the embodiment illustrated, there is about a four-inch difference in elevation of the tub 52 between its upper and lower positions.

Referring again to FIG. 14, the blender apparatus 38 further includes the leveling valve means 62, which has previously been referred to as an automatic level control means 62. The leveling valve means 62 provides a means for controlling a level of fluid within the movable blender tub 52.

The leveling valve means 62 preferably is a butterfly type valve disposed in the liquid supply conduit 308 for controlling the amount of liquid drawn from liquid supply 310 by the low pressure pump 58. It will be appreciated that as the flow rate of liquid drawn from liquid supply 310 is reduced, the amount of liquid being recirculated to blender tub 52 will also be reduced, thus tending to reduce the level of fluid within the blender tub 52. Similarly, as the valve 62 is opened, more fluid will be drawn from liquid supply 310, thus tending to increase the level of fluid within the blender tub 52.

A connector link means 348 is pivotally connected to blender tub support arm 56 and to a crank handle 350 extending from a rotatable stem 352 of valve 62, so that movement of blender tub support arm 356 is transmitted by linkage 348 to rotate the stem 352 and thus open or close the butterfly valve 62. The connector link means 348 may be generally described as a means operably associated with the blender tub 52 and the leveling valve means 62 for adjusting the leveling valve means in response to movement of the blender tub 52 relative to the base 50 of blender apparatus 38.

As schematically shown in FIGS. 12 and 13, a second control valve means 354 may be disposed in the tub outlet conduit 306. The two control valves 62 and 354 may both be operably connected to the blender tub 52 so that the control valve 354 opens as the control valve 62 closes and vice versa. Also the valve 354 may be arranged solely for manual operation. For example, where the water supply 310 is being sucked from a pit, it may be desirable to manually close down on the valve 354 on the tub outlet line 306 to increase the suction provided to the fluid supply line 308.

Turning now to FIGS. 23-26, the specific construction of the blender tub 52 is thereshown.

The generally conically shaped tub 52 has an oval shaped upper end 356, and a generally circular shaped lower end 358. As is best seen in FIG. 23, the circular lower end 358 has an inner diameter 360 less than a width 362 of generally oval shaped upper end 356.

Figure 23:
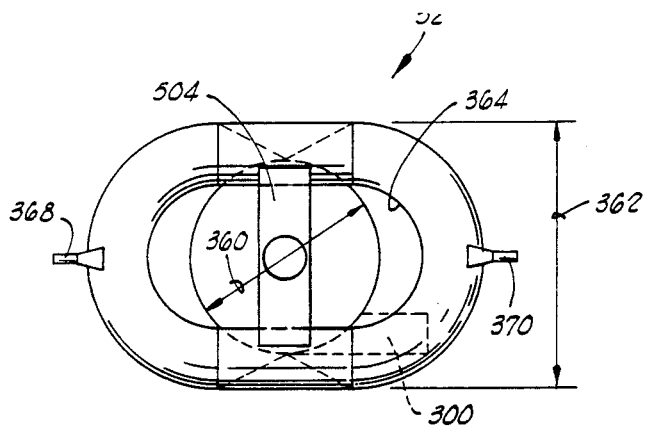
FIG. 23 is a plan view of a steel blender tub.
Figure 25:
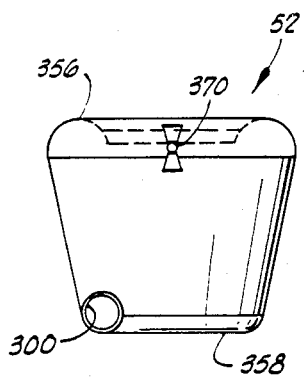
FIG. 25 is a right end elevation view of the blender tub of FIG. 24.
Figure 24:
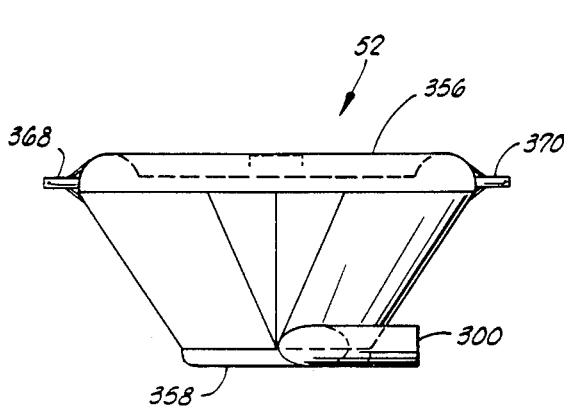
FIG. 24 is a rear elevation view of a steel blender tub.
Figure 26:
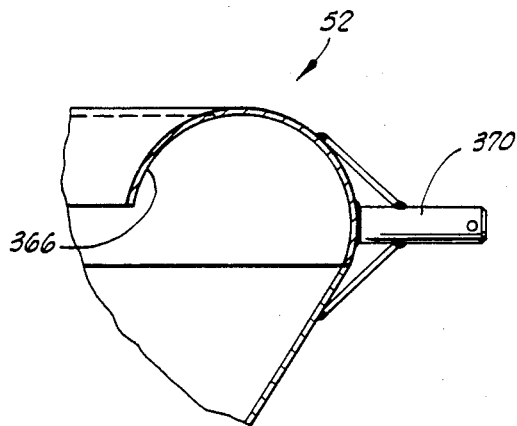
FIG. 26 is an enlarged sectioned view of the upper perimeter of the blender tub of FIG. 24.
Figure 27:
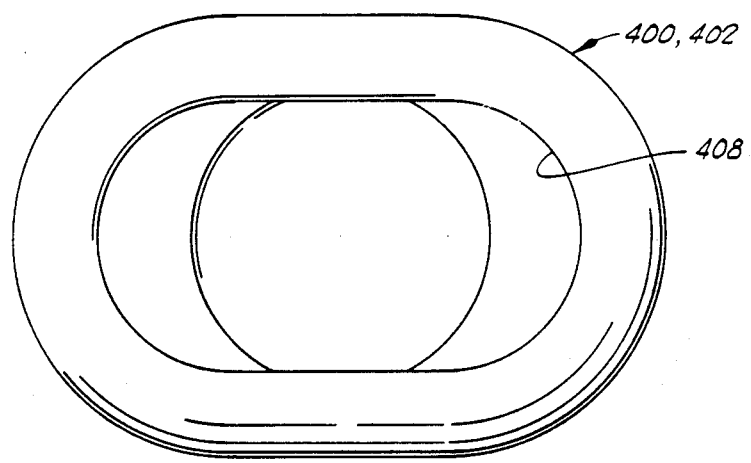
FIG. 27 is a plan view of a non-metallic blender tub liner of the type utilized with a tub support framework.
Figure 28:
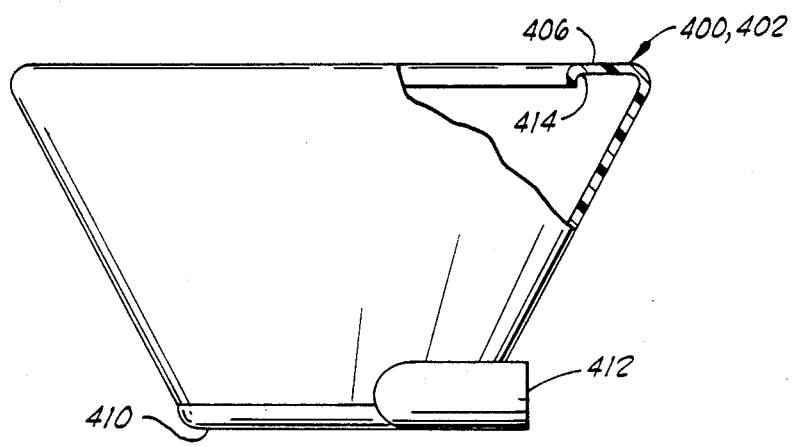
FIG. 28 is a rear elevation view of the tub liner of FIG. 27.
Figure 29:
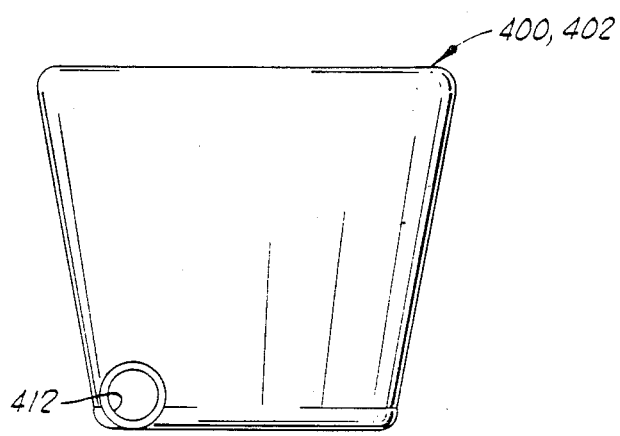
FIG. 29 is a right end elevation view of the tub liner of FIG. 28.

The tub outlet 300 previously described is a generally tangential fluid outlet as best seen in FIG. 23, and is defined in the lower portion of the blender tub 52 for supplying fluid to the suction of pump 58.

The generally conically shaped downwardly tapered blender tub 52, and associated mixing apparatus to be described below, is constructed to generate a vortex type of fluid flow pattern within the mixing tub, which circulates in a counterclockwise direction as viewed from above in FIG. 23.

The generally tangential fluid outlet means 300 in the bottom of the blender tub 52 is oriented such that this counterclockwise vortex flow aids in directing fluid flow out the tangential outlet 300 toward the suction of pump 58.

Although this vortex type of flow may be induced or aided by a mechanical agitator as described below, it is noted that the action of tangential outlet 300 alone provides a means for generating such a vortex type flow.

As best seen in FIG. 23, the upper end 356 of blender tub 52 is open having a generally oval shaped opening 364. The blender tub 52 further has a radially inward extending splash guard means 366 (see FIG. 26) extending around the perimeter of the open upper end 356 for reducing splashing of fluid out of the blender tub 52.

For generation of the downward swirling vortex type of mixing flow, the preferred shape of tub 52 would be a true conically tapered tub, but in order to have sufficient room within the opening 364 at the upper end of the tub for placement of the mechanical mixer, for adding of dry materials from the hopper 66 and for return of the recirculating fluid, it was necessary to enlarge the upper end and it was determined that this can be most efficiently accomplished by an oval shaped upper end 356. The lower end 358 is preferably maintained in a circular shape so that the rotating bottom mixing means can clearly sweep particulate material from the bottom end to keep it from accumulating there.

The blender tub 52 has axles 368 and 370 welded thereto for pivotal connection with the upper ends of the blender tub support arms 54 and 56.

The blender apparatus 38 further includes a resilient means generally designated by the numeral 372 (see FIGS. 14, 15 and 17) for causing the movable blender tub 52 to be resiliently movable relative to the base 50. This resilient means 372 is located external of the blender tub 52 so as not to interfere with the vortex type of fluid flow pattern within the generally conically shaped blender tub 52.

The resilient means 372 includes an outer tube 374 to which the lower ends of blender tub support arms 54 and 56 are rigidly attached, and a torsion bar 376 coaxially received within the outer tube 374.

The torsion bar has one end thereof adjacent support arm 54 fixedly attached to the outer tube 374. The other end 378 (see FIG. 15) of the torsion bar 376 is not attached to the outer tube 374. An arm 380 extends radially outward from the end 378 of torsion bar 376 and is adjustably positioned relative to the base 50 by a pair of adjusting nuts 382 threadedly received on a rod 384 which is fixedly positioned relative to base 50.

By adjustment of the adjusting nuts 382 upon rod 384, a preset torsion load on the torsion bar 376, which is thus transmitted to the outer tube 374 and thus to the support arms 54 and 56, can be applied to bias the blender tub 52 toward its upwardmost position relative to the base 50.

The blender tub 52 has a center of gravity laterally offset from first pivotal connection 344. As the load in blender tub 52 is increased by raising the fluid level therein, that load is transferred through support arms 54 and 56 to the outer tube 374 and thus twists the torsion bar 376 as the blender tub 52 moves resiliently downward relative to base 50.

As seen in FIGS. 14 and 17, the blender assembly 38 further includes a density compensating cylinder 394 connected between support arm 54 and base 50 for compensating for changes in density in the fluid contained in blender tub 52. The torsion on torsion bar 376 would generally be preset based upon the anticipated weight of the tub when it is filled with fluid of the anticipated density. If the fluid density in the tub is heavier or lighter than the anticipated density, the preset torque on torsion bar 376 will cause the fluid level in the tub to run lower or higher, respectively, than desired. In order to accommodate changes in fluid density in the tub during a job, the density compensating cylinder 394 is used along with a pressure regulator (not shown). Pressure is applied to the cylinder as necessary to compensate for fluid densities above or below the anticipated fluid density. Thus, the fluid density compensating cylinder 394 offsets any change in the weight of a full tub of fluid as compared to the anticipated weight for which the torsion bar 376 has been preset.

The blender apparatus 38 further includes a tub orientation control linkage means 386 (see FIG. 17) having a first end pivotally connected to base 50 at pivot point 388 and having a second end pivotally connected to blender tub 52 at pivot point 390 for controlling an orientation of a vertical axis 392 of blender tub 52. The four pivot points 344, 346, 390 and 388 define a parallelogram so that the axis 392 of blender tub 52 remains substantially vertical thus preventing tilting of the blender tub 52 as the tub 52 moves between its first and second positions relative to the base 50.

Directing attention now to FIGS. 27-33, an alternative design of the blender tub 52 is thereshown and generally designated by the numeral 400.

In some uses of the blender assembly 38, it is desirable to have a complete non-ferrous system wherein the blended fluid is not contacted with any ferrous materials. This is particularly true where the fluid being blended is an acid fluid. In such a system, the various manifolding of blender assembly 38 will be provided with Teflon ® sleeves or the like so that there is no exposure to ferrous materials.

For such a non-ferrous system, the alternative blender tub 400 is utilized. The non-ferrous blender tub 400 includes a non-metallic liner 402 which has the generally conically tapered shape previously described for blender tub 52. The non-metallic liner is shown in three views in FIGS. 27-29. The non-metallic liner 402 is supported in a tubular basket-type tub support framework 404 seen in FIGS. 31-33.

The non-metallic liner 402 has a generally oval shaped upper end 406 having an oval shaped opening 408 defined therein. It further includes a generally circular lower end 410, and a tangential tub outlet 412 all dimensioned generally as previously described for blender tub 52. The non-metallic liner 402 further includes a radially inward extending splash guard means 414 extending around a perimeter of the open upper end 406.

The non-metallic tub liner 402 is preferably molded from a crosslinked high density polyethylene resin. This provides a very tough chemical resistant material that is rated for temperature service of minus 40° F. to 180° F. It is good for acid and caustic service and also for solvents at ambient temperatures.

Figure 31:
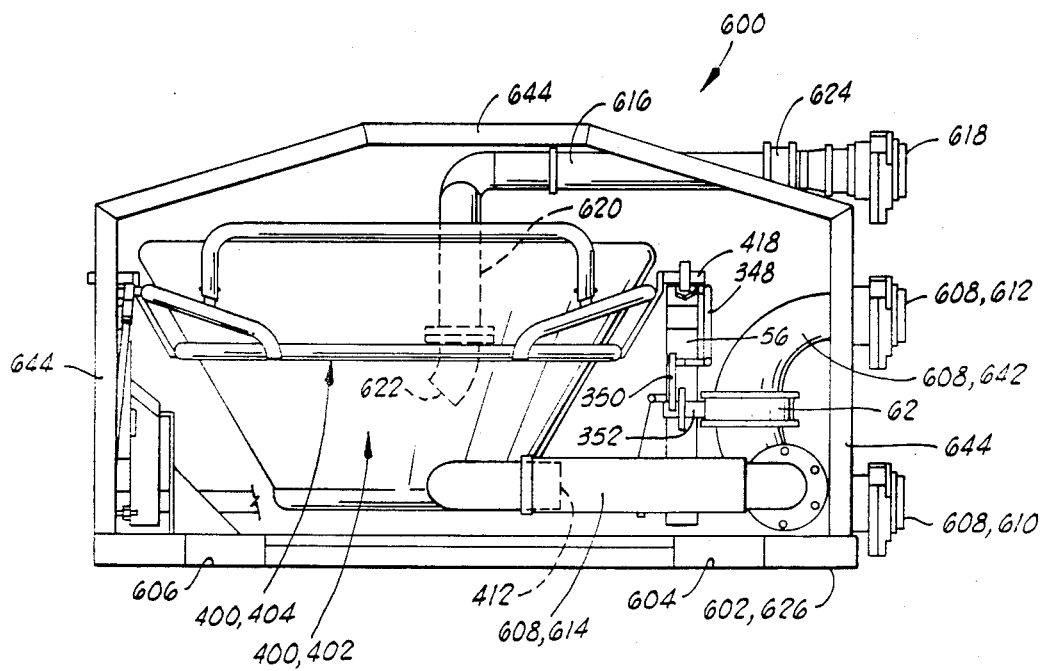
FIG. 31 is a rear elevation view of the apparatus of FIG. 30.
Figures 32, 33:
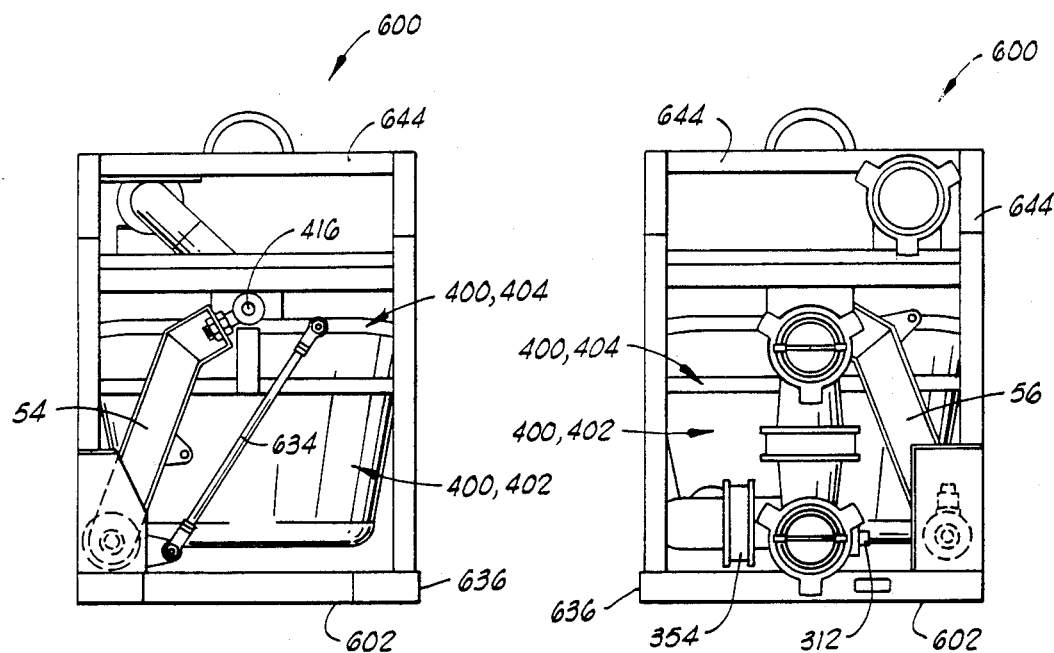
FIG. 32 is a left end elevation view of the apparatus of FIG. 31.
FIG. 33 is a right end elevation view of the apparatus of FIG. 31.

The tub support framework 404 cradles the tapered outer surface of tub liner 402 as seen in FIGS. 31-33, and includes axles 416 and 418 by means of which the non-ferrous tub assembly 400 is supported from the blender tub support arms 54 and 56 in the same manner as previously described with regard to blender tub 52.

Mechanical Mixer For Blender Tub

Turning now to FIGS. 18-22, a rotating mechanical mixing means generally designated by the numeral 500 is shown in place within the blender tub 52 previously described. The mixing means 500 is designed to induce and/or aid a generally vortex type of fluid flow pattern within the tub 52, and as previously described that vortex fluid flow pattern is oriented so as to circulate counterclockwise as viewed from above so that it aids in directing fluid out the tub outlet 300.

The mixing means 500 includes a drive motor 502 mounted on a support plate 504 (see FIG. 23) which extends across the top of blender tub 52.

The motor 502 rotates a vertical shaft 505 which extends downward within the blender tub 52.

The shaft 505 and other operating portions of the mixing means 500 attached thereto which are located within the tub 52 are shown in dashed lines in FIG. 18. The individual components are shown in detail in FIGS. 19-22.

The mixing means 500 includes a top rotating agitator means 506 located near an upper fluid level schematically illustrated at 508 of blender tub 52 for breaking up and spreading solid materials such as sand fed into the upper end of blender tub 52 such as from the dry materials hopper 66. The mixer 500 is used in blender assembly 38 to wet sand from hopper 66 with sand-laden fluid being recirculated to blender tub 52, which is much more difficult than wetting sand with clean fluid as is done in a normal blender.

The mixing means 500 further includes a reversing helically screw flight means 510 located below the top rotating agitator means 506 for causing fluid in the blender tub 52 adjacent the screw flight means 510 to flow upwards within the tub. This breaks up the vortex immediately surrounding shaft 505. It will be apparent from the construction of screw flight means 510 that when the same is rotated counterclockwise as viewed from above, the screw flight means 510 will draw fluid located in the center of the blender tub 52 upwards.

When any imaginary vertical section is taken through the blender tub extending radially outward from the axis of shaft 505, the action of the screw flight 510 will be causing fluid particles to follow a somewhat circular path flowing upward near the shaft 506, then radially outward as the upper level 508 is approached, then downward along the inner surface of blender tub 52, then radially inward toward the shaft 506 at the bottom of blender tub 52.

The mechanical mixing means 500 further includes a bottom rotating agitator means 512 located near the bottom 358 of blender tub 52.

Figure 20:
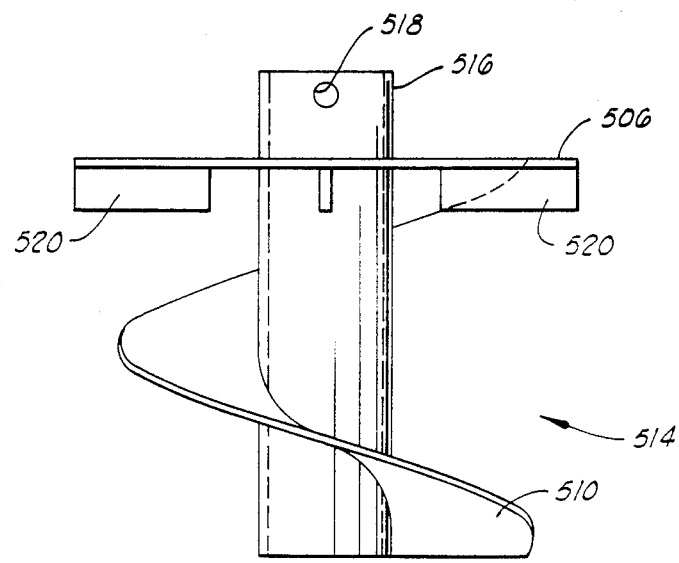
FIG. 20 is an elevation view of the top rotating agitator means of FIG. 19.

As best seen in FIG. 20, the top rotating agitator means 506 and the reversing helical screw flight means 510 are integrally constructed as a single overall component assembly 514. The assembly 514 includes an inner mounting tube 516 which is coaxially received about shaft 505 and adjustably positioned thereon by means of a set screw (not shown) which threadedly engages set screw hole 518 and has an inner end abutting the outer surface of shaft 505 to hold the assembly 514 in place upon the shaft 505. This permits the assembly 514 to be adjustably positioned so that its position relative to the upper fluid level 508 can be controlled.

Figure 19:
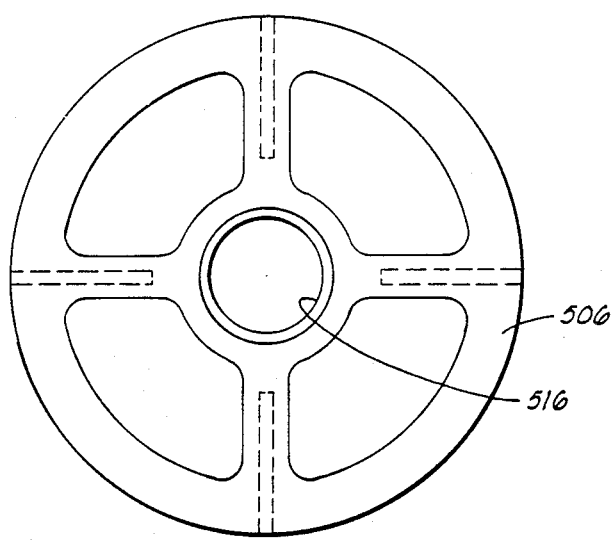
FIG. 19 is a plan view of the top rotating agitator means of the mechanical agitator.

As best seen in FIGS. 19 and 20, the top rotating agitator means 506 is generally disc shaped and has four downward extending paddles 520 attached thereto.

Figure 21:
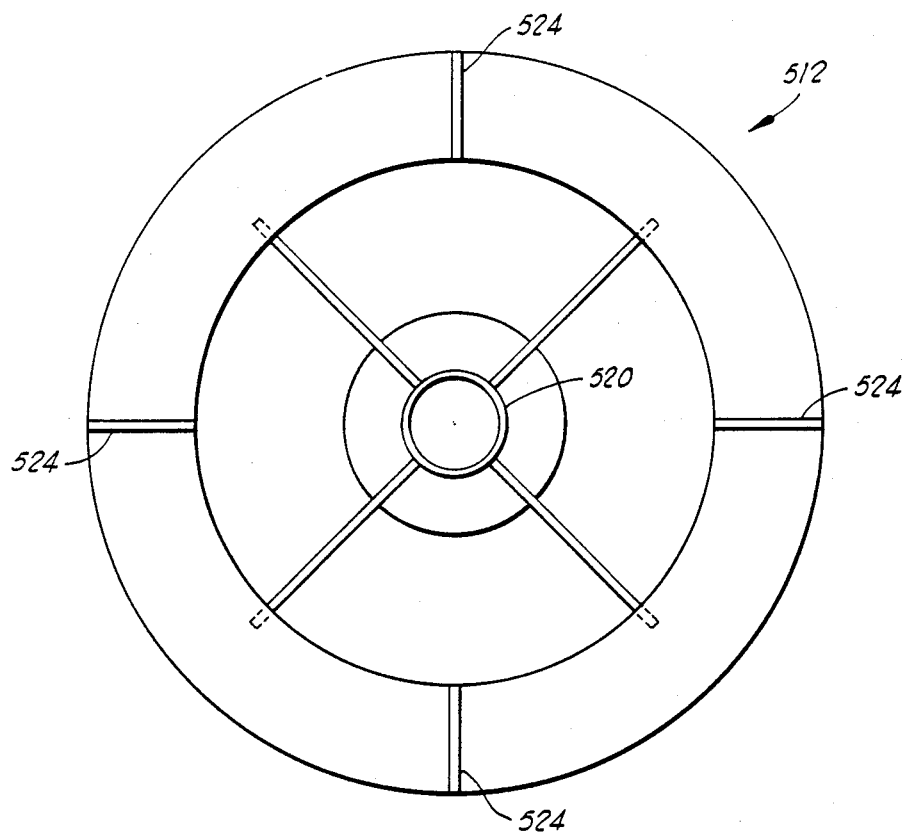
FIG. 21 is a plan view of a bottom rotating agitator means of the mechanical agitator.
Figure 22:
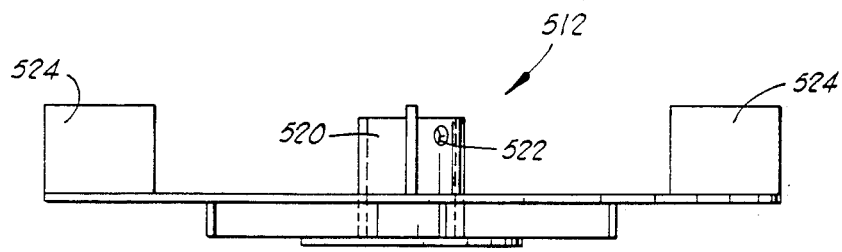
FIG. 22 is an elevation view of the bottom rotating agitator means of FIG. 21.

The bottom rotating agitator means 512 is best illustrated in FIGS. 21 and 22. Bottom rotating agitator means 512 includes a central mounting tube 520 which is adjustably positioned on drive shaft 505 by a set screw (not shown) threadedly disposed through set screw mounting hole 522. This permits a clearance between the bottom rotating agitator means 512 and the bottom 358 of blender tub 352 to be adjusted.

The bottom rotating agitator means 512 is also disc shaped and has four upward extending paddles 524 attached thereto.

The bottom rotating agitator means may be inverted so that the paddles 524 extend downward.

The bottom rotating agitator means 512 provides a means for sweeping particulate materials such as sand from the bottom of the blender tub 52 and into the tangential outlet 300 of blender tub 52.

When the mixing means 500 is used with a non-ferrous blender tub 400 of FIGS. 27-33, the mixing means 500 is mounted on a mounting plate 524 which is supported from the liner supporting framework 404. In such a system, the agitator means may be constructed of non-ferrous metal and plastic.

Skid-Mounted Blender Assembly Of FIGS. 30-33

FIGS. 30-33 depict an alternative embodiment of the blender assembly wherein the blender tub and its self-leveling control apparatus are contained on a skid which does not contain a pump. Connections are provided for connecting the blender tub of FIGS. 30-33 to an external pump.

The skid mounted blender assembly of FIGS. 30-33 is generally designated by the numeral 600 and may be generally referred to as a self-leveling mixer apparatus 600.

The blender assembly 600 includes a transportable skid frame 602. The blender tub 400 previously described is supported from the skid frame 602 by blender tub support arms 54 and 56 so that the blender tub 400 is movable between first and second positions as previously described with regard to the earlier embodiment.

It is noted that many of the components of the blender apparatus 600 are identical or nearly identical to apparatus previously described with regard to blender assembly 38. In those instances, the same designating numerals previously used are utilized with regard to blender assembly 600.

Although the non-ferrous blender tub 400 is shown in FIGS. 30-33 in combination with the blender assembly 600, it will be understood that the blender tub 52 could also be utilized with the blender assembly 600.

The primary difference between the blender assembly 600 and the blender assembly 38 of FIGS. 1 and 2 is that the pump 58 has been removed and the various piping has been changed to provide for connection of the blender assembly 600 to an externally located pump.

The skid frame 602 is designed to be set on the bed of a truck or a trailer, and it may be operated either in that position, or it may subsequently be placed on the ground by use of a forklift or the like. The skid frame 602 includes fork openings 604 and 606 so that the skid frame 602 may be moved by use of a conventional forklift truck.

The blender apparatus 600 includes a suction conduit means 608 supported from the skid frame 602 for transport therewith. The suction conduit means 608 includes a manifold inlet means 610 for connection to a fluid source such as fluid source 310 schematically illustrated in FIGS. 12 and 13.

Suction conduit means 608 further includes a manifold outlet means 612 for connection to a suction of a pump similar to the pump 58 but located separate from the skid frame 602.

The suction conduit means 608 further includes a tub outlet conduit portion 614 located upstream of the manifold outlet 612 and connected to the tub fluid outlet 412.

The level control valve means 62 is disposed in the suction conduit means 608 upstream of the manifold outlet 612 for controlling the level of fluid in blender tub 400 as previously described.

A second control valve 354, as previously described with regard to FIGS. 12 and 13, is disposed in the tub outlet conduit portion 614. In the embodiment illustrated, the valve 354 is arranged for manual operation only.

The connector link means 348 extends from blender tub support arm 56 to the crank extension 350 from stem 352 of control valve 62 so as to restrict the opening of the control valve 62 as the blender tub 400 moves downward as the fluid level therein increases, all in the same manner as generally previously described.

The apparatus 600 further includes a recirculating conduit means 316 supported from the skid frame 602 for transport therewith. The recirculating conduit means 616 includes a recirculating conduit inlet means 618 for connection to a discharge of the previously mentioned separate pump. The recirculating conduit means 616 also includes an outlet portion 620 extending downward through the open upper end 408 of blender tub 400 and terminating at an open outlet 622 within the tub liner 402.

A valve 624 is disposed in the recirculating conduit means 616 between the recirculating conduit inlet 618 and the open outlet 622.

Figure 30:
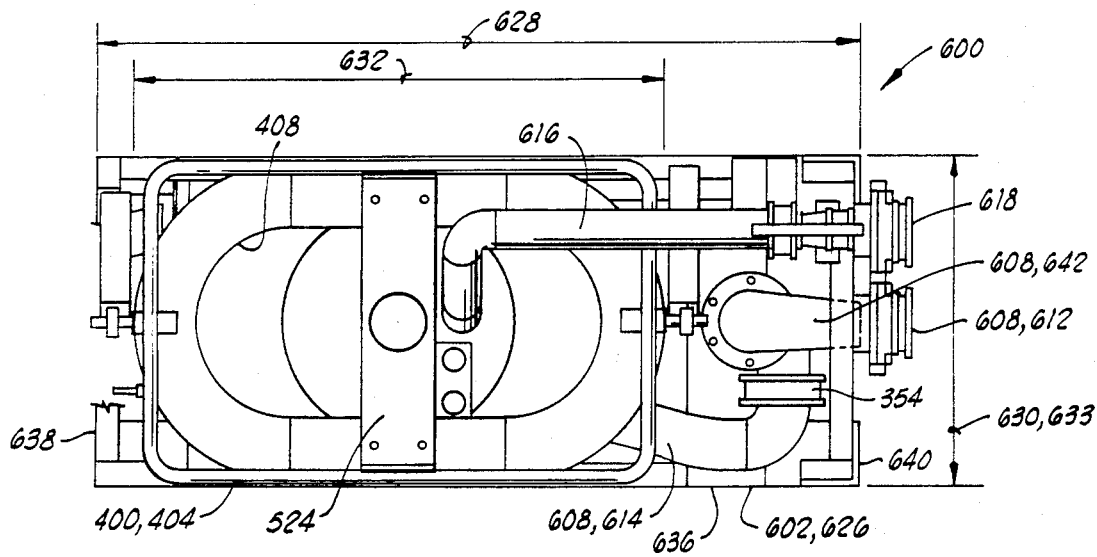
FIG. 30 is a plan view of an alternative embodiment of the blender assembly, wherein the tub and its self-leveling control apparatus are contained on a skid which does not contain a pump. Connections are provided for connecting the blender tub of FIG. 30 to an external pump. The blender tub of FIG. 30 utilizes a non-metallic liner contained within a supporting framework.

As is best seen in FIG. 30, the skid frame 602 has a substantially rectangular skid base 626 having a base length 628 and a base width 630.

The tub liner 402, as previously described, has a generally ova shaped upper end which defines a tub length 632 and a tub width 633 oriented substantially parallel to said base length 628 and base width 630, respectively.

The base width 630 is substantially equal to the tub width 633, and the base length 628 is substantially greater than the tub length 632.

As best seen in FIG. 32, a tub orientation control length means 634 is connected between skid frame 602 and the supporting framework 404 of non-ferrous tub assembly 400, and functions in a manner like tub orientation link 386 previously described with regard to FIG. 17 to prevent tilting of the non-ferrous tub assembly 400 as it moves between its upper and lower positions.

As is apparent in FIGS. 30, 32 and 33, which illustrate the non-ferrous tub assembly 400 in its upwardmost position relative to the skid frame 602, the skid frame 602 and the tub assembly 400 and tub support arms 54 and 56 are so arranged and constructed that when the tub assembly 400 is in its said upper first position, the tub assembly 400 is substantially entirely located over the rectangular skid base 626. As will be readily apparent upon considering the necessary motion of the tub assembly 400 as the support arms 54 and 56 rotate downward to a position like that shown in phantom lines in FIG. 17, when the tub assembly 400 is in its lower second position, a portion of said tub assembly will extend past the edge 636 of the rectangular skid base 626.

As is readily apparent in FIGS. 30 and 31, the tub assembly 400 is located substantially nearer the left end 638 of skid base 602 than it is to the right end 640 of skid base 602. The suction conduit means 608 is generally located between the tub assembly 400 and the right end 640 of skid base 602.

As is best seen in FIG. 31, the suction conduit means includes a U-shaped conduit portion 642 having the manifold inlet means 610 and the manifold outlet means 612 defined on opposite ends thereof and facing away from the tub assembly 400. The leveling control valve means 62 is disposed in this U-shaped conduit portion 642.

The previously mentioned tub outlet conduit portion 614 connects to this U-shaped manifold portion 642 between the control valve 62 and the manifold inlet means 610.

The skid frame 602 further includes a skid cage 644 rigidly attached to said skid base 626 and extending upwardly therefrom over the tub assembly 400.

The U-shaped conduit portion 642 is supported at least partially from the skid cage 644 with the manifold inlet means 610 and manifold outlet means 612 extending out of the skid cage 644 as best seen in FIGS. 30 and 31.

The recirculating conduit means 616 previously described is also supported at least partially from the skid cage 644.

It will be apparent that the skid mounted blender apparatus 600 of FIGS. 30-33 will operate in generally the same manner as the blender apparatus 38 previously described once the connections 610, 612 and 618 are connected to a fluid supply, a pump suction inlet, and a pump discharge outlet, in a manner generally like that previously described with regard to the blender apparatus 38.

Although not shown in FIGS. 30-33, the system 600 may include a dry materials hopper 66 as previously described.

Other Applications Of The Blender Tub System

It will be apparent that the basic constant level blender tub apparatus including the tub, the support arms, a base, the control valve 62 and connecting linkage could be utilized in any number of ways with various other apparatus in which a blender tub is necessary.

For example, the blender tub disclosed herein could be placed on the side of an acid tank truck much as shown in U.S. Pat. No. 4,490,047 to Stegemoeller et al. As will be understood by those skilled in the art, there is often the need when conducting acidizing jobs on oil wells to mix various particulate materials with the acid fluids which are being pumped downhole. In these instances, the volumes of material being mixed are not large, and it is very inefficient to bring a conventional blender truck to the job. The blender apparatus disclosed herein, however, may be incorporated in such a blender truck, again much as shown in U.S. Pat. No. 4,490,047 to provide the necessary blending capabilities.

The basic blending tub disclosed herein can be utilized on many other applications where a relatively small capacity blender is desirable.

Thus it is seen that the apparatus of the present invention readily achieves the ends and advantages mentioned as well as those inherent therein. While certain preferred embodiments of the present invention have been illustrated and described for the purposes of the present disclosure, numerous changes in the arrangement and construction of parts may be made by those skilled in the art which changes are encompassed within the scope and spirit of the present invention as defined by the appended claims.

What is claimed is:

1. A tank mounting assembly, comprising:
   a tank having a plurality of tank legs extending downward therefrom;
   a mounting rack having a plurality of mounting positions defined thereon for receiving said tank legs, said mounting rack including at least one first pin receiving hole disposed through a substantially vertical wall of said rack and aligned with at least one second pin receiving hole disposed through each of said tank legs, said mounting rack further having at least one notch defined therein and associated with said first pin receiving hole;
   a connecting pin received through said aligned first and second pin receiving holes, said connecting pin having a locking bar fixedly attached to one end thereof and extending radially therefrom and received in said notch of said mounting rack; and
   pin retainer means, connected to said rack, for retaining said locking bar in said notch and thereby retaining said connecting pin in said first and second pin receiving holes.

2. The assembly of claim 1, wherein:
   said mounting rack has a pair of said notches, associated with each of said first pin receiving holes, the notches of each pair of notches being located on opposite sides of said vertical wall and spaced so that said connecting pin may be inserted through said first and second pin receiving holes from either direction and said locking bar thereof may be received in one notch of said pair of notches.

3. The assembly of claim 1, wherein:
   said mounting rack has a length and a width, and said mounting rack has a central raised portion extending generally parallel to said length so that when one of said tanks is received on said rack, said raised portion is relatively closely straddled by said legs of said tank.

4. The assembly of claim 1, wherein:
   said tank is one of a plurality of tanks mounted on said mounting rack.

5. The assembly of claim 1, wherein:
   said connecting pin is a cylindrical pin having an enlarged generally circular head defined on said one end thereof, and said locking bar is fixedly attached to said enlarged head.

6. A tank mounting apparatus and tank combination, comprising:
   a mounting rack having a generally rectangular-shaped, full-size tank base location defined thereon, and including a plurality of mounting means for selectively mounting any chosen one of four tank base arrangements within said full-size tank base location, said four tank base arrangements being one full-size tank base, two half-size tank bases, four quarter-size tank bases, and one half-size and two quarter-size tank bases, said plurality of mounting means including eight mounting means, four of which are located along each of two opposite generally parallel sides of said full-size tank base location, said eight mounting means including four corner mounting means located generally in the four corners of said generally rectangular full-size tank base location, and said eight mounting means including four intermediate mounting means;
   releasable connecting means for connecting said tank bases to said mounting means; and
   two quarter-size tanks, wherein:
   each of said quarter-size tanks has a quarter-size tank base including two legs;
   two of said legs of one of said quarter-size tanks are fixedly connected to two of said legs of the other of said quarter-size tanks;
   one of the two remaining legs of each of said quarter-size tanks is releasably connected to one of said corner mounting means; and
   the other of the two remaining legs of each of said quarter-size tanks is releasably connected to one of said intermediate mounting means.

7. The apparatus of claim 1, wherein:
   said mounting rack has a plurality of such full-size tank base locations defined thereon.

8. The apparatus of claim 6, wherein:

each of said mounting means includes a first pin receiving hole disposed through a substantially vertical wall of said rack; and each of said releasable connecting means includes:
- a connecting pin constructed to be received through said first pin receiving hole of said mounting means and an aligned second pin receiving hole disposed in one of said tank bases; and
- pin retainer means for retaining said connecting pin in said first and second pin receiving holes.

9. The apparatus of claim 8, wherein:
said mounting means and said releasable connecting means are so arranged and constructed that said connecting pin may be inserted through said first and second aligned pin receiving holes from either direction.

10. A tank mounting apparatus, comprising:
a mounting rack having a full-size tank base location defined thereon, and including a plurality of mounting means for selectively mounting any chosen one of four tank base arrangements within said full-size tank base location, said four tank base arrangements being one full-size tank base, two half-size tank bases, four quarter-size tank bases, and one half-size and two quarter-size tank bases;

releasable connecting means for connecting said tank bases to said mounting means; and wherein said mounting rack has a length and a width, and said mounting rack has a central raised portion extending generally parallel to said length so that when one of said tank bases is received on said rack, said raised portion is relatively closely straddled by downwardly extending legs of said tank base, with said releasable connecting means including connecting pins extending generally horizontally from said central raised portion through said legs of said tank base.

* * * * *

UNITED STATES PATENT AND TRADEMARK OFFICE
CERTIFICATE OF CORRECTION

PATENT NO. : 4,872,794

DATED : October 10, 1989

INVENTOR(S) : Gail F. Davis et al.

It is certified that error appears in the above-identified patent and that said Letters Patent is hereby corrected as shown below:

In column 9, line 53, delete the word [nd] and insert therefor --and--.
In column 20, line 20, delete the word [ova] and insert therefor --oval--.

Signed and Sealed this

Twenty-ninth Day of October, 1991

Attest:

HARRY F. MANBECK, JR.

*Attesting Officer*     *Commissioner of Patents and Trademarks*